United States Patent
Phillips et al.

(10) Patent No.: US 8,235,288 B2
(45) Date of Patent: *Aug. 7, 2012

(54) METHOD FOR USE IN ASSOCIATION WITH IDENTIFICATION TOKEN AND APPARATUS INCLUDING IDENTIFICATION TOKEN

(75) Inventors: Simon Phillips, York (GB); John Robert Wankmueller, Great Neck, NY (US)

(73) Assignee: MasterCard International, Inc., Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/205,148

(22) Filed: Aug. 8, 2011

(65) Prior Publication Data

US 2011/0303747 A1 Dec. 15, 2011

Related U.S. Application Data

(63) Continuation of application No. 11/852,804, filed on Sep. 10, 2007, now Pat. No. 7,992,779.

(51) Int. Cl.
*G06F 17/00* (2006.01)
*G06K 5/00* (2006.01)
*G06K 7/00* (2006.01)
*G06K 7/08* (2006.01)
*G06Q 20/00* (2012.01)
*G06Q 40/00* (2012.01)

(52) U.S. Cl. ........ 235/380; 235/375; 235/379; 235/435; 235/451; 705/16; 705/41; 705/65; 705/66; 705/67

(58) Field of Classification Search .......... 235/379, 235/380, 375, 435, 451; 705/16–17, 41, 705/65–67
See application file for complete search history.

(56) References Cited

U.S. PATENT DOCUMENTS
2006/0283960 A1* 12/2006 Top ....................... 235/492
2007/0176898 A1* 8/2007 Suh ....................... 345/158
* cited by examiner

*Primary Examiner* — Michael G Lee
*Assistant Examiner* — Laura Gudorf
(74) *Attorney, Agent, or Firm* — Buckley, Maschoff & Talwalkar LLC

(57) ABSTRACT

In some embodiments, a method comprises: sensing at least one of movement and position of an identification token; determining if a criteria is satisfied; and enabling operation of the identification token if the criteria is satisfied; wherein determining if the criteria is satisfied comprises determining if the at least one of movement and position satisfies a reference criteria; and wherein the sensor comprises a sensor to provide a signal indicative of at least one of movement and position of the identification token prior to presentation to a proximity coupling device. In some embodiments, apparatus comprises: an identification token comprising: a sensor to provide a signal indicative of at least one of movement and position of the identification token; circuitry, to receive the signal, to determine if a criteria is satisfied, and to enable operation of the identification token if the criteria is satisfied; wherein the circuitry comprises circuitry to determine if the at least one of movement and position satisfies a reference criteria wherein the sensor comprises a sensor to provide a signal indicative of at least one of movement and position of the identification token prior to presentation to a proximity coupling device.

17 Claims, 13 Drawing Sheets

METHOD FOR USE IN ASSOCIATION WITH IDENTIFICATION TOKEN AND APPARATUS INCLUDING IDENTIFICATION TOKEN

BACKGROUND

Proximity payment devices are in widespread use. Many are card-shaped and resemble a standard credit card in appearance although other form factors are also used. It has also been proposed to equip consumer devices, such as wristwatches and the like, with proximity payment capabilities.

A well known standard for proximity payment devices has been promulgated by MasterCard International Incorporated, the assignee hereof, and is referred to as "PayPass". Proximity payment devices typically include a radio frequency identification (RFID) integrated circuit (IC) embedded in a plastic body or contained in a housing. An antenna is also embedded in the plastic body or housing. The antenna may allow the proximity payment device to receive a power signal from a point of sale terminal. The antenna is also used by the internal circuits to communicate information with the POS terminal, such as the payment account number, and possibly other information as well.

One issue faced by account holders with proximity payment devices is that a wrongdoer may attempt to interrogate proximity payment devices to download account numbers therefrom without their knowledge. It has been proposed to protect against this possibility by preventing proximity payment devices from transmitting the account numbers unless the user is pressing a switch on the device at the time that the device is interrogated. However, if this approach were applied to a proximity payment device provided as a wristwatch, bracelet or wristband, the user would need to engage in an awkward two-handed maneuver to have the device read by the POS terminal.

BRIEF DESCRIPTION OF THE DRAWINGS

FIG. 2I is a flow chart that illustrates a method in accordance with some embodiments;

DETAILED DESCRIPTION

Figure 1:
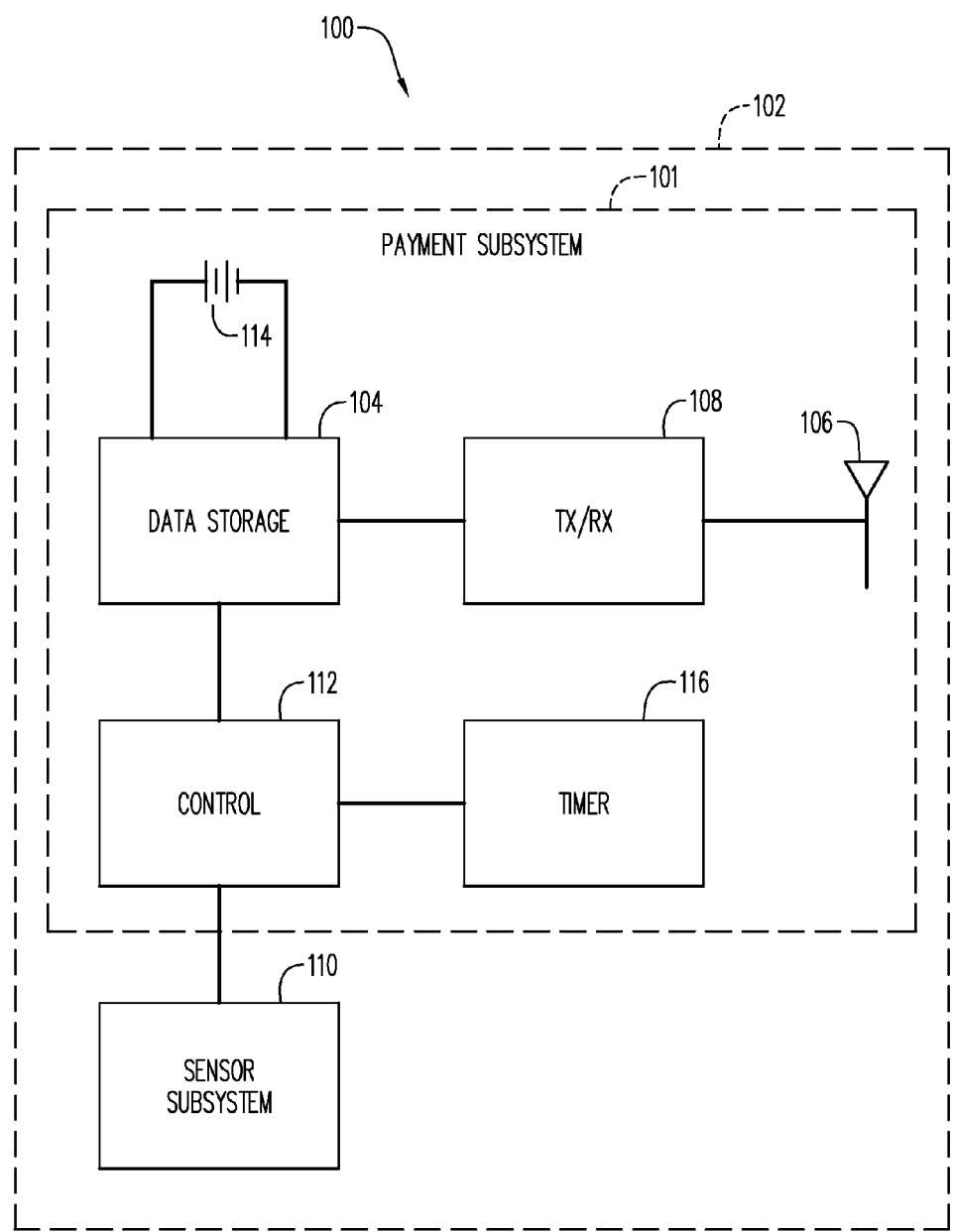
FIG. 1 is a schematic block diagram representation of a proximity payment device provided according to some embodiments.

FIG. 1 is a schematic block diagram representation of a proximity payment device 100 according to some embodiments. Referring to FIG. 1, according to some embodiments, the proximity payment device 100 may include a payment subsystem 101, a sensor subsystem 110 and a support structure 102, which may support the payment subsystem 101, the sensor subsystem 110 and/or other components of the proximity payment device 100. In some embodiments, the payment subsystem 101 may comprise an RFID IC, which except as described herein, may operate generally in accordance with conventional practices (such as those contained in the "PayPass" standard) related to exchange of data by a proximity payment device with a point of sale terminal. The sensor subsystem 110 may comprise an accelerometer, a rotation sensor, a velocity sensor a position sensor and/or another type of sensor that senses movement and/or position of the proximity payment device 100. In some embodiments, the sensor subsystem 110 may comprise a sensor that is the same as and/or similar to a sensor typically used in a stepometer. In some embodiments, a position sensor may comprise a mercury switch.

The support structure 102 may comprise a housing, casing and/or plastic body that supports the payment subsystem 101, the sensor subsystem 110 and/or some or all other components of the proximity payment device 100. As used herein, the support structure 102 supports a component of the proximity payment device 100 if the component is at least (i) partially and/or entirely disposed on, disposed in, contained in, mounted on, mounted in, installed on, installed in and/or embedded in the support structure 102 and/or (ii) partially and/or entirely disposed on, disposed in, contained in, mounted on, mounted in, installed on, installed in and/or embedded in a component that is supported by the support structure 102. In some embodiments, the payment subsystem 101 and/or the sensor subsystem 110 may be disposed entirely within the support structure 102.

In operation, the sensor subsystem 110 may sense movement and/or position of the proximity payment device 100 and may provide a signal indicative thereof. As used herein, a signal may be any type of signal, i.e., an analog signal, a digital signal, a single ended signal, a differential signal and/or any other type of signal or combination thereof. The signal may be supplied to the payment subsystem 101, which may determine whether the movement and/or position sensed by the sensor subsystem 110 satisfies a reference criteria. If the movement and/or position satisfies the reference criteria, the payment subsystem 101 may perform one or more functions, which may include enabling operation of the proximity payment device 100. If the movement and/or position sensed by the sensor subsystem 110 does not satisfy the reference criteria, the payment subsystem 101 may perform one or more other functions, which may include disabling operation of the proximity payment device 100.

As used herein the phrase "enabling operation of the proximity payment device" means enabling the proximity payment device to provide information. In some embodiments, the information provided by the proximity payment device may be a payment account number based at least in part on information stored therein. In some embodiments, the information provided by the proximity payment device may be supplied to another device.

If the proximity payment device 100 is enabled for operation, the proximity payment device 100 may, in some embodiments, operate in accordance with a conventional proximity payment device. For example, if the proximity payment device 100 is enabled for operation, the proximity payment device may operate in accordance with the above-mentioned "PayPass" standard. In that regard, the proximity payment device 100 may be presented to a proximity coupling device (not shown in FIG. 1) of a POS terminal (not shown) to accomplish payment for a sales transaction. The proximity coupling device may transmit an interrogation signal. If the proximity payment device 100 is enabled, the payment subsystem 101 may transmit a signal to the proximity coupling device in response to the interrogation signal. One or more signals transmitted by the payment subsystem 101 may include a payment card account number and/or other information required for interaction with the proximity coupling device. In some embodiments, the payment subsystem may transmit the payment card account number and/or other information after a handshake procedure or the like with the POS terminal. The POS terminal may then interact with a payment card system to charge the current sales transaction to the payment card account represented by the payment card account number received from the proximity payment device 100.

If the proximity payment device is worn on and/or carried by one wrist or hand, it may be possible to move and/or position the proximity payment device 100, so as to enable operation of the proximity payment device 100, using the wrist or hand on which the device is worn and/or by which the device is carried, and without the use of the other wrist or hand. This may be helpful if the other wrist or hand is not free. In some embodiments, it may also be possible to present the proximity payment device 100 to a proximity coupling device of the POS terminal using the wrist or hand on which the device is worn and/or by which the device is carried, and without the use of the other wrist or hand. This may also be helpful if the other wrist or hand is not free.

In some embodiments, instead of or in addition to being worn on a wrist, the proximity device may be (i) worn on an arm, hand, finger, neck and/or other part of the user's body and/or (ii) carried in a hand or other part of the user's body and/or in clothing or other article worn and/or carried by the user.

In some embodiments, the proximity payment device 100 may be presented to a proximity coupling device (not shown in FIG. 1) before, during and/or after enabling operation of the proximity payment device 100.

In some embodiments, presenting the proximity payment device 100 to a proximity coupling device may comprise tapping the proximity payment device 100 on a portion of the proximity coupling device (e.g., a designated portion of the proximity coupling device, which may include a transmitter and/or receiver). In some embodiments, the proximity payment device 100 may be presented to a proximity coupling device only by tapping the proximity payment device 100 on a portion of the proximity coupling device (e.g., a designated portion of the proximity coupling device, which may include a transmitter and/or receiver).

In accordance with some embodiments, the sensing of the movement and/or position of the proximity payment device may be initiated prior to presentation to a proximity coupling device. This may permit a greater range of movement and/or positioning and as a result, may permit more flexibility in the choice of reference criteria and/or (ii) may make it possible to sense movement and/or position for a longer duration (which may make it possible to collect more data and/or give a user more time to perform an action or actions) and/or with greater resolution. One or more of the above may contribute to a more effective comparison between sensed movement and/or position and the reference criteria.

In some embodiments, this may be facilitated by providing the power source 114 prior to presenting the device to a proximity coupling device. Thus, the availability of power from a power source prior to presenting the device to a proximity coupling device (i) may permit a greater range of movement and/or positioning of the proximity payment device, and as a result, may permit more flexibility in the choice of reference criteria and/or (ii) may make it possible to sense movement and/or position for a longer duration (which may make it possible to collect more data and/or give a user more time to perform an action or actions) and/or with greater resolution. One or more of the above may contribute to a more effective comparison between sensed movement and/or position and the reference criteria.

In some embodiments a reference criteria may be associated with both enabling operation and disabling operation of the proximity payment device 100. In that regard, in some embodiment, the proximity payment device 100 is enabled for operation if a reference criteria is satisfied a first time and disabled from operation if the reference criteria is satisfied a second time.

In some embodiments, the reference criteria may be satisfied by shaking the proximity payment device 100 at least one time. In that regard, if the sensor subsystem 110 comprises an accelerometer, the reference criteria may be satisfied if the acceleration indicates that the proximity payment device 100 has been shaken at least one time.

In some embodiments, the reference criteria may require that the movement and/or position have a magnitude equal to or in excess of a reference magnitude. Thus, if the sensor subsystem 110 comprises an accelerometer, the reference criteria may require that the acceleration have a magnitude equal to or in excess of a reference magnitude. In some embodiments, the reference magnitude may be chosen to help minimize the possibility of enabling operation of the proximity payment device 100 when the user does not desire to enable operation of the proximity payment device 100.

In some embodiments, the reference criteria may require that the movement and/or position have a profile that matches a reference profile over a duration of time. In some embodiments, the reference magnitude and/or reference profile may comprise a fixed reference magnitude and/or fixed reference profile, respectively. In some embodiments, the reference magnitude and/or reference profile may comprise an adaptively determined reference magnitude and/or reference profile, respectively.

In some embodiments, the payment subsystem 101 may include a data storage circuit 104, an antenna 106, transmit/receive circuitry 108 and/or a control circuit 112. In some embodiments, such data storage circuit 104, antenna 106, transmit/receive circuitry 108 and/or control circuit 112 may be provided in a conventional manner. In some embodiments, the data storage circuit 104 may be a simple memory device capable only of responding to a pre-defined set of commands, or a secure microcontroller capable of executing a pre-defined program. In both instances, these circuits may store the payment account details necessary for the communication with the POS terminal. In accordance with known practices, additional data may be stored in the data storage circuit in some embodiments.

In some embodiments, the antenna 106 may be a loop antenna arranged in and/or supported on the proximity payment device 100. Alternatively, the antenna 106 may be of a different type and/or configuration. In some embodiments, the antenna 106 may be operative to receive interrogation and power signals (which may be the same signal) from a proximity coupling device of a POS terminal and to transmit payment card account number information and/or other information to the proximity coupling device. In some embodiments, the antenna 106 may be operative to receive interrogation and power signals and to transmit payment card account number information and/or other information to the proximity coupling device in accordance with the above-mentioned PayPass standard.

In some embodiments, the transmit/receive circuitry 108 couples the data storage circuit 104 to the antenna 106 to allow the data storage circuit 104 to transmit data signals to the POS terminal via the antenna 106 and/or to receive data signals and/or an interrogation signal from the POS terminal via the antenna 106. Although the transmit/receive circuitry 108 is shown as separate from the data storage circuit 104, in practice the transmit/receive circuitry 108 may be integrated with the data storage circuit 104. For example, the data storage circuit 104 and the transmit/receive circuit 108 may be included in an RFID IC, which is not separately shown in FIG. 1 (In some embodiments, processing may also be included in an RFID IC).

In some embodiments, the control circuit 112 may be operative to receive the signal provided by the sensor subsystem 110 and determine whether a movement and/or a position sensed by the sensor subsystem 110 matches a reference profile.

Still further, in some embodiments, the proximity payment device 100 may include a power source 114, which may be coupled directly or indirectly to, and may supply power to, the control circuit 112, the data storage circuit 104 and also possibly the transmit/receive circuit 108. In some embodiments, the power source 114 comprises a batter. In some embodiments, where the proximity payment device 100 is a wristwatch, the power source 114 may comprise a watch battery, which also supplies power to non-payment-related components (not shown) of the watch.

In some embodiments, the control circuit 112 may be powered by the power source 114 and operative to receive the signal provided by the sensor subsystem 110 and determine whether the movement and/or the position sensed by the sensor matches a reference profile, at times when the proximity payment device 100 is not being interrogated by a POS terminal.

In some embodiments, the payment subsystem 101 may also include a timer circuit 116, which may be coupled to the control circuit 112 to define a period of time of predetermined length commencing with a point in time at which the control circuit 112 detects actuation of the switch 110. The timer may be an electronic circuit that includes a digital counter and/or a circuit of a kind used in a conventional digital watch to measure passage of time. Alternatively, timer circuit 116 may be an electrical circuit that includes a capacitor that is initially charged to start the time period and then is discharged over time to measure out the time period.

In some embodiments, the control circuit 112 and/or the timer circuit 116 may be integrated in an RFID IC (not separately shown in FIG. 1) with the data storage circuit 104 and the transmit/receive circuit 108.

In some embodiments, the control circuit 112 is configured and/or programmed and/or interacts with the data storage circuit 104 and/or the transmit receive circuit 108 such that the proximity payment device 100 is not operative to transmit the device payment account number and/or otherwise to interact with a POS terminal unless and/or until the control circuit 112 determines that the reference criteria is satisfied.

Except as described herein, in some embodiments, the RFID IC may operate generally in accordance with conventional practices (such as those contained in the "PayPass" standard) related to exchange of data by a proximity payment device with a point of sale terminal.

In some embodiments, one or more of the components of the payment subsystem 101 may be selectively enabled/disabled in order to enable and/or disable operation of the proximity payment device 100. In some embodiments, the control circuit 112 may selectively enable/disable one or more of the components and/or selectively couple/not couple components in order to enable and/or disable operation of the proximity payment device 100.

Figure 2A:
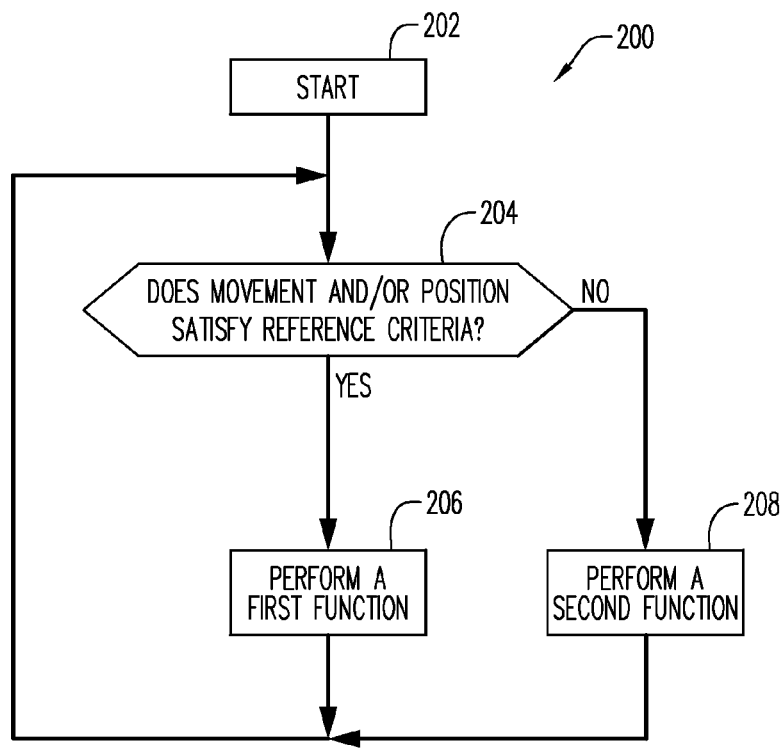
FIG. 2A is a flow chart that illustrates a method in accordance with some embodiments.

FIG. 2A is a flow chart of a method 200 according to some embodiments. The method 200 is not limited to the order shown in the flow chart. Rather, embodiments of the method 200 may be performed in any order that is practicable. For that matter, unless stated otherwise, any method disclosed herein may be performed in any order that is practicable. Unless stated otherwise, the method 200 may be performed in any manner. In some embodiments, one or more portions of the method 200 may be performed by the proximity payment device 100 or one or more portions thereof. In some embodiments, one or more portions of the method may be performed by the payment subsystem 101 or one or more portions thereof. In some embodiments, one or more portions of the method may be performed by the control circuit 112. In some embodiments, one or more portions of the method may be used to enable operation of the proximity payment device 100, disable operation of the proximity payment device 100 and/or perform another function. In some embodiments, one or more portions of the method may be performed while power is applied to the proximity payment device 100. In some embodiments, one or more portions of the method may be performed while power is applied to at least a portion of the embodiment of the payment subsystem 101 illustrated in FIG. 1.

Referring to FIG. 2A, the method may start at 202. At 204, the method may include determining whether a movement and/or a position of the proximity payment device satisfies a reference criteria. In some embodiments, determining whether a movement and/or a position of the proximity payment device satisfies a reference criteria may comprise monitoring a signal provided by the sensor subsystem 110. In some embodiments, the determination may be based at least in part on a signal provided by the sensor subsystem 110. In some embodiments, determining whether the reference criteria is satisfied may comprise determining whether the movement and/or position has a magnitude equal to or in excess of a reference magnitude and/or within a reference range. In some embodiments, determining whether the reference criteria is satisfied may comprise determining whether the movement and/or position has a magnitude having a profile over time that matches a reference profile.

In some embodiments, the reference criteria may require that the proximity payment device be shaken at least one time with a force having a magnitude in excess of a reference magnitude. In some embodiments, the reference criteria may require that the proximity payment device be shaken multiple times with a force having a magnitude in excess of a reference magnitude and within a reference time period.

If the reference criteria is satisfied, then at 206, the method may include performing one or more functions associated therewith. In some embodiments, the one or more functions may include enabling operation of the proximity payment device 100. If at 204 the reference criteria is not satisfied, then at 208, the method may include performing one or more functions associated therewith. In some embodiments, the one or more functions may include disabling and/or or not enabling operation of the proximity payment device 100. In some embodiments, the one or more functions may include not changing the enabled/disabled state of the proximity payment device 100. Thereafter, execution may return to 204.

In some embodiments, the method 200 may include disabling the operation of the proximity payment device 100 unless and/or until the reference criteria is satisfied. The proximity payment device 100 may be considered to be disabled or not enabled so long as it is in this condition.

Figure 2B:
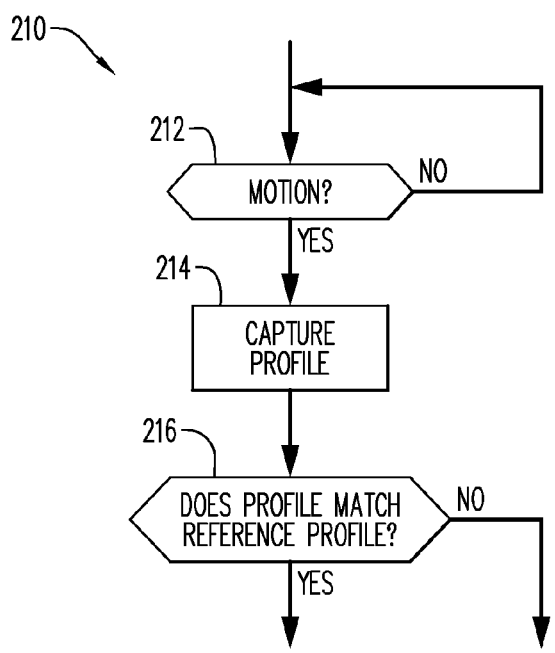
FIG. 2B is a flow chart that illustrates a method in accordance with some embodiments.

FIG. 2B is a flow chart of a method 210 according to some embodiments. In some embodiments, one or more portions of the method 210 may be performed at 204 in the method 200 of FIG. 2A. In some embodiments, the method, or one or more portions thereof, may be used in determining whether the movement and/or position has a magnitude having a profile over time that matches a reference profile. In some embodiments, one or more portions of the method 210 may be performed by the proximity payment device 100 or one or more portions thereof. In some embodiments, one or more portions of the method may be performed by the payment subsystem 101 or one or more portions thereof. In some embodiments, one or more portions of the method may be performed by the control circuit 112. In some embodiments, one or more portions of the method may be performed while power is applied to the proximity payment device 100. In some embodiments, one or more portions of the method may be performed while power is applied to at least a portion of the embodiment of the payment subsystem 101 illustrated in FIG. 1.

Referring to FIG. 2B, at 212, the method may include determining whether there has been any movement of the proximity payment device 100. In some embodiments, determining whether there has been any movement may comprise monitoring a signal provided by the sensor subsystem 110. In some embodiments, the determination as to whether there has been any movement may be based at least in part on a signal provided by the sensor subsystem 110.

If it is determined that there has not been any movement of the proximity payment device 100, then execution may remain at 212. If it is determined that there has been movement of the proximity payment device, then at 214, the method may include capturing the signal indicative of the movement and/or the position of the proximity payment device 100. In some embodiments, capturing the signal may comprise capturing the magnitude of the signal over a duration of time.

At 216, the method may further include determining whether the captured profile matches a reference profile. If the captured profile matches the reference profile, then the method may include performing one or more functions associated therewith. In some embodiments, the one or more functions may include enabling operation of the proximity payment device 100. In some embodiments, the method may include enabling operation of the proximity payment device 100 for a duration and/or until the account number is transmitted by the proximity payment device 100. In some embodiments, the method may comprise enabling operation of the proximity payment device 100 until the reference criteria is satisfied again.

If the captured profile does not match the reference profile, then the method may include performing one or more functions associated with not matching the reference profile. In some embodiments, the one or more functions may include disabling and/or or not enabling operation of the proximity payment device 100. In some embodiments, the one or more functions may include not changing the enabled/disabled state of the proximity payment device 100.

Figure 2C:
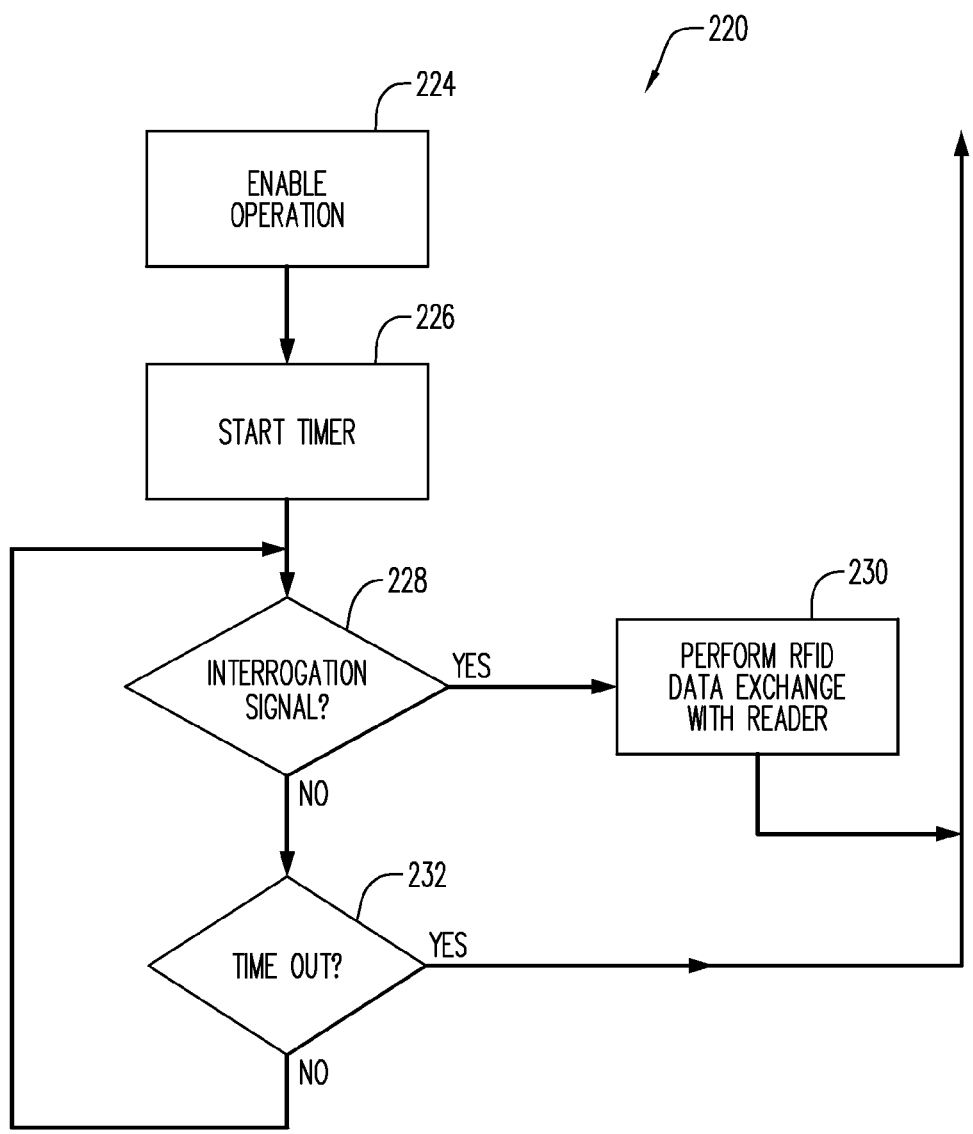
FIG. 2C is a flow chart that illustrates a method in accordance with some embodiments.

FIG. 2C is a flow chart of a method 220 according to some embodiments. In some embodiments, one or more portions of the method may performed at 206 in the method 200 of FIG. 2A. In some embodiments, the method, or one or more portions thereof, may be used in enabling operation of the proximity payment device 100 for a time period. In some embodiments, one or more portions of the method 220 may be performed by the proximity payment device 100 or one or more portions thereof. In some embodiments, one or more portions of the method may be performed by the payment subsystem 101 or one or more portions thereof. In some embodiments, one or more portions of the method may be performed by the control circuit 112. In some embodiments, one or more portions of the method may be performed while power is applied to the proximity payment device 100. In some embodiments, one or more portions of the method may be performed while power is applied to at least a portion of the embodiment of the payment subsystem 101 illustrated in FIG. 1.

Referring to FIG. 2C, at 224, the method may include enabling operation of the proximity payment device 100 and at 226, the method may further include starting a timer, wherein a time period may be initiated during which the proximity payment device 100 may remain in the enabled condition.

In accordance with some embodiments, the control circuit 112 may start the timer, which may comprise the timer circuit 116 (FIG. 1). With the start of the time period, the timer circuit 116 may be initialized to measure out, and thereby determine a concluding end point of, the time period. For example, a counter circuit (which may be part of the timer circuit 116 but is not separately shown) may be caused to start counting up from zero by counting clock pulses (from a clock circuit which is not separately shown) and the count value of the counter circuit may be compared with a fixed value to determine when the count value has reached the fixed value, thereby indicating the end of the time period. In some embodiments, the length of the time period may be 20 seconds.

At 228, the method may further include determining whether an interrogation signal is received from a POS terminal (not shown). If so, at 230, the account number for the device payment account and/or other information may be sent to the POS terminal via the antenna 106. This may be done, for example, as part of an exchange of communications between the proximity payment device 100 and the POS terminal.

In some embodiments, after the account details or other information is sent at 230, the execution may return to 204 of method 200 (FIG. 2A). In other words, in the method 220 illustrated in FIG. 2C, the proximity payment device 100 may be disabled upon sending of the account number, and may remain disabled until the reference criteria is satisfied again at 204 of method 200 (FIG. 2A). Thus, in some embodiments, the proximity payment device 100 can be read at most once, after each time that the reference criteria is satisfied.

However, in an alternative embodiment, the method 220 illustrated in FIG. 2C may be modified such that execution returns to 228. In such embodiment, the proximity payment device 100 may continue to be enabled to be read until the time period initiated at 226 comes to an end.

At 232, the method may include determining whether the time period has come to an end. In some embodiments, the determination at 232 may be part of a loop with decision block 228 and may be performed before, after or essentially simultaneously with decision block 228. In such embodiments, the loop of decision blocks 228, 232 may continue until either the account number is sent or the time period expires. If it is determined at 232 that the time period has expired, then execution may return to 204 of method 200 (FIG. 2A). In some embodiments, the method may include disabling the operation of the proximity payment device 100 unless and/or until the reference criteria is satisfied again. In that regard, in some embodiments, the method may include, at 204, idling in the condition in which it is not enabled to transmit the account number so long as the reference criteria is not satisfied.

In some embodiments, with this arrangement of the proximity payment device 100, it may be operated in the following manner. With the device worn on one wrist of the user, the user may perform one or more actions that cause the movement and/or position of the proximity payment device 100 to satisfy a reference criteria. The proximity payment device 100 may be enabled and the user may then (or earlier) place the wrist with the device on it next to (or at any position that is suitable relative to) the proximity coupling device of the POS terminal to have the device read during the time period initiated by actuation of the switch.

In some embodiments, the proximity payment device 100 may include information for more than one payment service. In that regard, in some embodiments, the proximity payment device 100 may include information for a debit account, a credit account and/or a transit ticket.

Figure 2D:
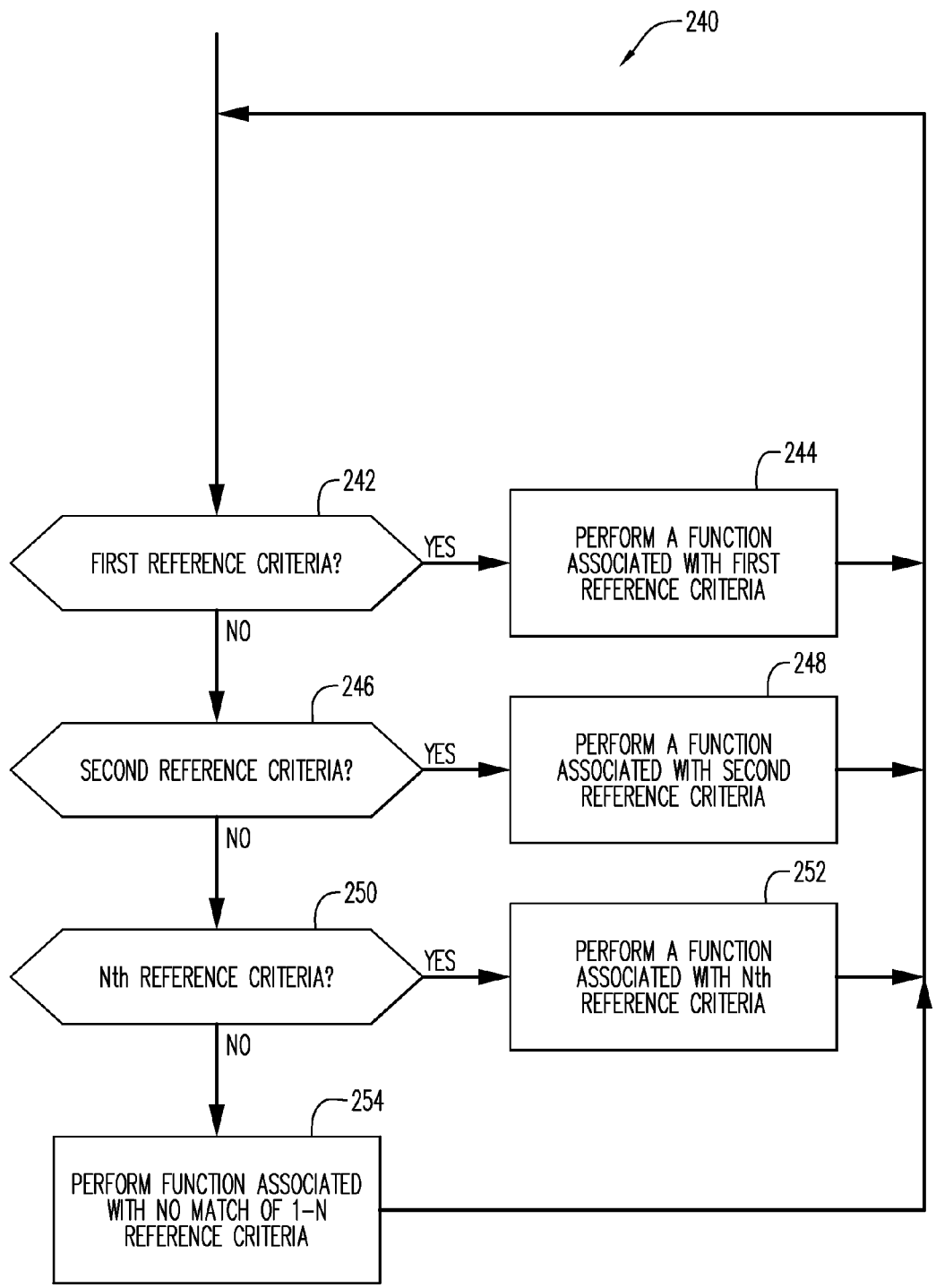
FIG. 2D is a flow chart that illustrates a method in accordance with some embodiments.

FIG. 2D is a flow chart of a method 240 according to some embodiments. In some embodiments, the method, or one or more portions thereof, may be used if the proximity payment device 100 includes information for more than one payment service. In some embodiments, one or more portions of the method 240 may be performed by the proximity payment device 100 or one or more portions thereof. In some embodiments, one or more portions of the method may be performed by the payment subsystem 101 or one or more portions thereof. In some embodiments, one or more portions of the method may be performed by the control circuit 112. In some embodiments, one or more portions of the method may be performed while power is applied to the proximity payment device 100. In some embodiments, one or more portions of the method may be performed while power is applied to at least a portion of the embodiment of the payment subsystem 101 illustrated in FIG. 1.

Referring to FIG. 2D, at 242, the method may include determining whether a movement and/or a position of the proximity payment device satisfies a first reference criteria. In some embodiments, the first reference criteria may require that the proximity payment device be shaken three times with a force having a magnitude in excess of a reference magnitude and within a reference time duration. Thus, if the sensor subsystem 110 comprises an accelerometer, the reference criteria may require that the acceleration indicate that the proximity payment device has been shaken three times with a force having a magnitude in excess of a reference magnitude and within a reference time duration.

If the first reference criteria is satisfied, then at 244, the method may include performing a first function associated therewith. In some embodiments, the first function may include enabling operation of the proximity payment device 100 for use in association with a first payment service, e.g., a debit account. In some embodiments, the first function may also include disabling operation of the proximity payment device 100 for use in association with other payment services. Execution may then return to 242.

If at 242, the first reference criteria is not satisfied, then at 246 the method may further include determining whether movement and/or a position of the proximity payment device satisfies a second reference criteria. In some embodiments, the second reference criteria may require that the proximity payment device be shaken two times with a force having a magnitude in excess of a reference magnitude, within a reference time duration.

If the second reference criteria is satisfied, then at 248 the method may include performing a second function. In some embodiments, the second function may include enabling operation of the proximity payment device 100 for use in association with a second payment service, e.g., a credit account. In some embodiments, the second function may also include disabling operation of the proximity payment device 100 for use in association with other payment services. Execution may then return to 242.

If at 246, the second reference criteria is not satisfied, then at 250 the method may further include determining whether movement and/or a position of the proximity payment device satisfies a third or nth reference criteria. In some embodiments, the third or nth reference criteria may require that the proximity payment device be shaken one time with a force having a magnitude in excess of a reference magnitude.

If the third reference criteria is satisfied, then at 252 the method may include performing a third or nth function. In some embodiments, the third or nth function may include enabling operation of the proximity payment device 100 for use in association with a third payment service, e.g., a transit ticket. In some embodiments, the third or nth function may also include disabling operation of the proximity payment device 100 for use in association with other payment services. Execution may then return to 242.

If at 250, the third reference criteria is not satisfied (i.e., neither the first reference criteria, nor the second reference criteria nor the third reference criteria is satisfied), then at 254, the method may include performing one or more functions associated with not satisfying either of the first, second and third reference criteria. In some embodiments, the one or more functions may include not changing the enabled/disabled state of the proximity payment device 100. In some embodiments, the one or more functions may include disabling and/or or not enabling operation of the proximity payment device 100. Execution may then return to 242.

In some embodiments, the method may be extended to include any number of reference criteria and any number of functions associated therewith.

In some embodiments, the method 200 may further include disabling the operation of the proximity payment device 100 unless and/or until at least one of the reference criteria is satisfied. The proximity payment device 100 may be considered to be disabled or not enabled so long as it is in this condition. In some embodiments, enabling operation of the proximity payment device 100 for use in association with a payment service may include enabling such operation for a duration and/or until information associated with the payment service is transmitted by the proximity payment device 100. In some embodiments, the method may comprise enabling operation of the proximity payment device 100 for use in association with payment service until the proximity payment device 100 is enabled for operation in association with another payment service.

Figure 2E:
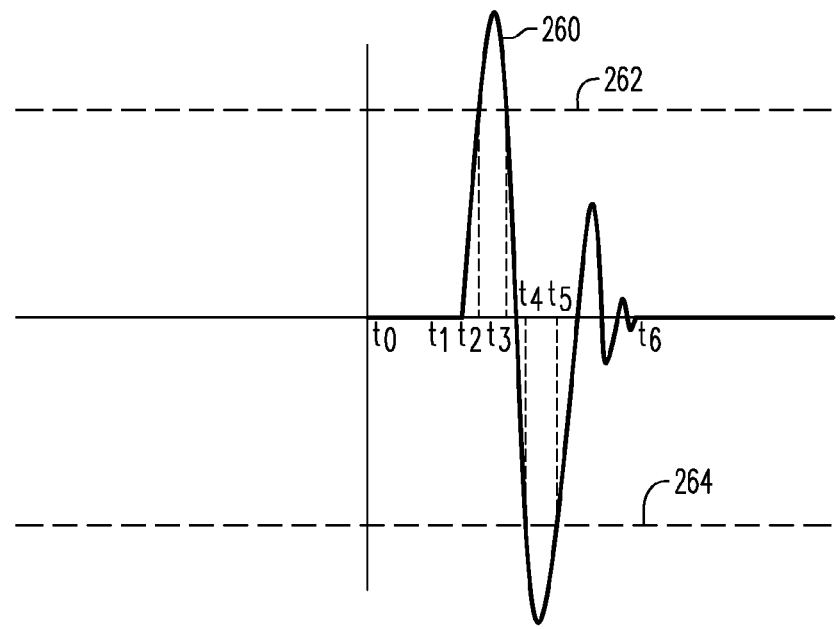
FIG. 2E is a schematic representation of a magnitude of a signal, in accordance with some embodiments.

FIG. 2E is a schematic representation of the magnitude of a signal that may be provided by a sensor subsystem 110 in response to shaking the proximity payment device 100 one time, with a force having a magnitude in excess of a reference magnitude and within a reference time duration, in accordance with some embodiments. Referring to FIG. 2E, in accordance with some embodiments, the signal may have a magnitude 260 that varies over time. At an initial time t0, the signal may have a magnitude, e.g., approximately zero, that is less than a first reference magnitude 262 (which may be a positive reference magnitude) and less than a second reference magnitude 264 (which may be a negative reference magnitude). At a first time, e.g., t1, the magnitude may begin to increase and at a second time, e.g., t2, the magnitude may be equal to the first reference magnitude. The magnitude may increase further and may then begin to decrease. The magnitude may exceed the first reference magnitude until a third time, e.g., t3. The magnitude may decrease further and may then increase (i.e., in a negative direction). At a fourth time, e.g., t4, the magnitude may be equal to the second reference magnitude. The magnitude may increase further and may then begin to decrease. The magnitude may exceed the second reference magnitude until a fifth time, e.g., t5. The magnitude may decrease further and at a sixth time, e.g., t6, may have a magnitude, e.g., approximately zero, that is less than the first reference magnitude and less than the second reference magnitude.

In some embodiments, the number of times that the magnitude crosses a reference magnitude may indicate the number of times that the proximity payment device was shaken with a force having a magnitude in excess of the reference magnitude. In this embodiment, the magnitude indicates that the proximity payment device was shaken one time with a force having a magnitude in excess of the first magnitude within a time duration of t0-t60.

Notably, shaking is not limited to the shaking schematically represented by the magnitude represented in FIG. 2E. In some embodiments, the magnitude may exceed a positive reference magnitude without exceeding a negative reference magnitude. In some embodiments, the magnitude may exceed a negative reference magnitude without exceeding a positive magnitude. In some embodiments, the magnitude may or may not vary smoothly over time, may or may not be sinusoidal, may or may not be periodic and may or may not have symmetry.

Figure 2F:
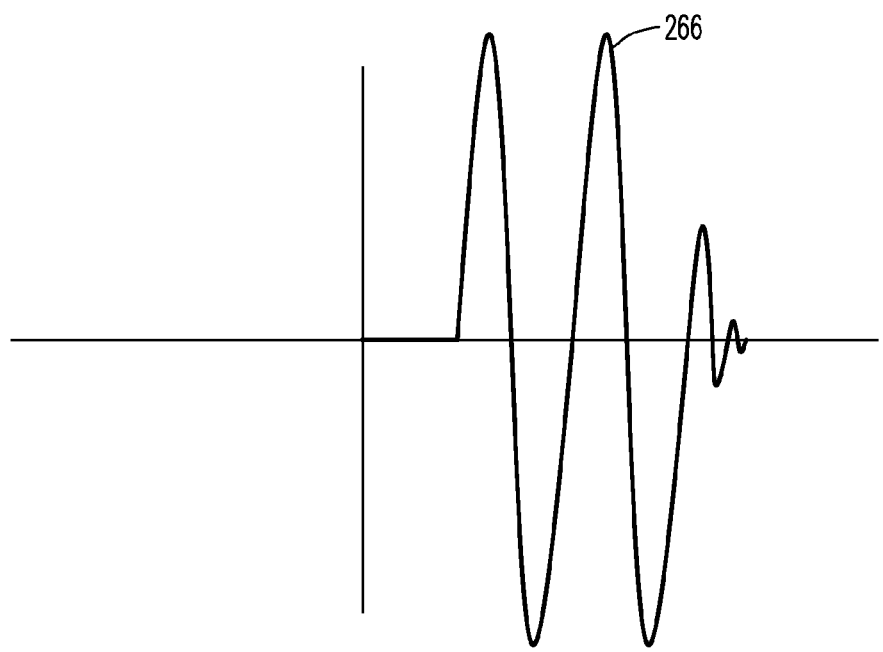
FIG. 2F is a schematic representation of a magnitude of a signal, in accordance with some embodiments.

FIG. 2F is a schematic representation of a waveform of a signal 266 that may be provided by a sensor subsystem 110 in response to shaking the proximity payment device 100 two times, with a force having a magnitude in excess of a reference magnitude within a reference time duration, in accordance with some embodiments.

Figure 2G:
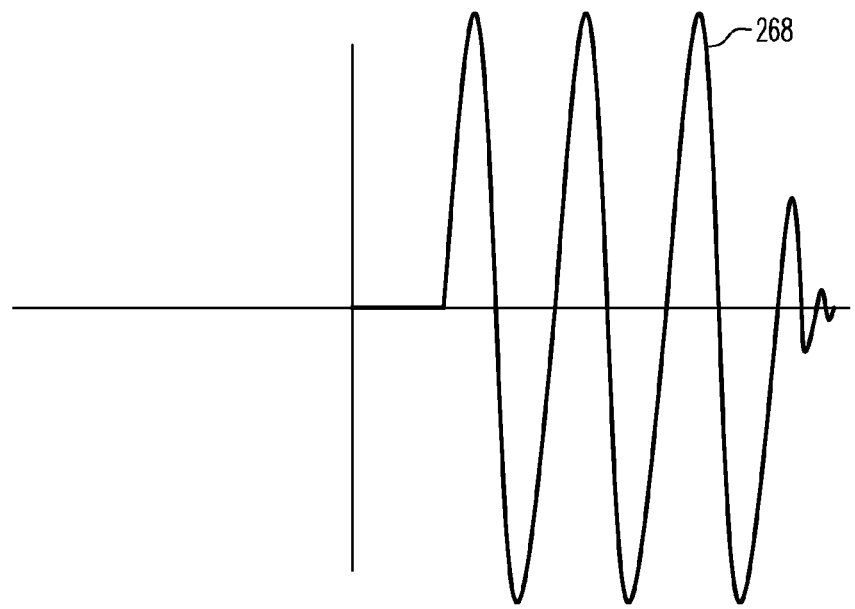
FIG. 2G is a schematic representation of a magnitude of a signal, in accordance with some embodiments.

FIG. 2G is a schematic representation of a waveform of a signal 268 that may be provided by a sensor subsystem 110 in response to shaking the proximity payment device 100 three times, with a force having a magnitude in excess of a reference magnitude and within a reference time duration, in accordance with some embodiments.

Figure 2H:
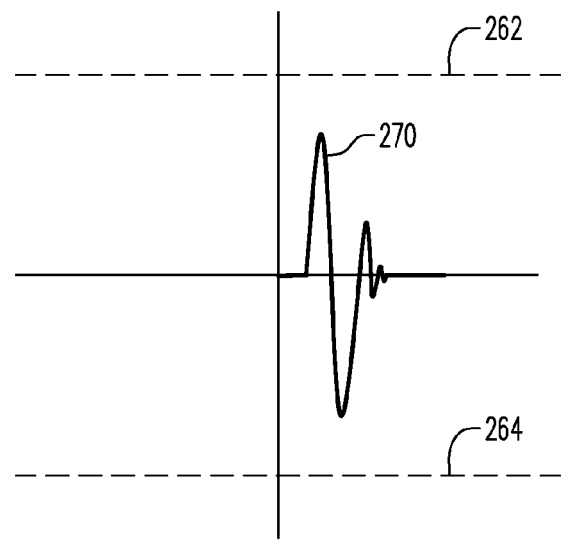
FIG. 2H is a schematic representation of a magnitude of a signal, in accordance with some embodiments.
Figure 21:
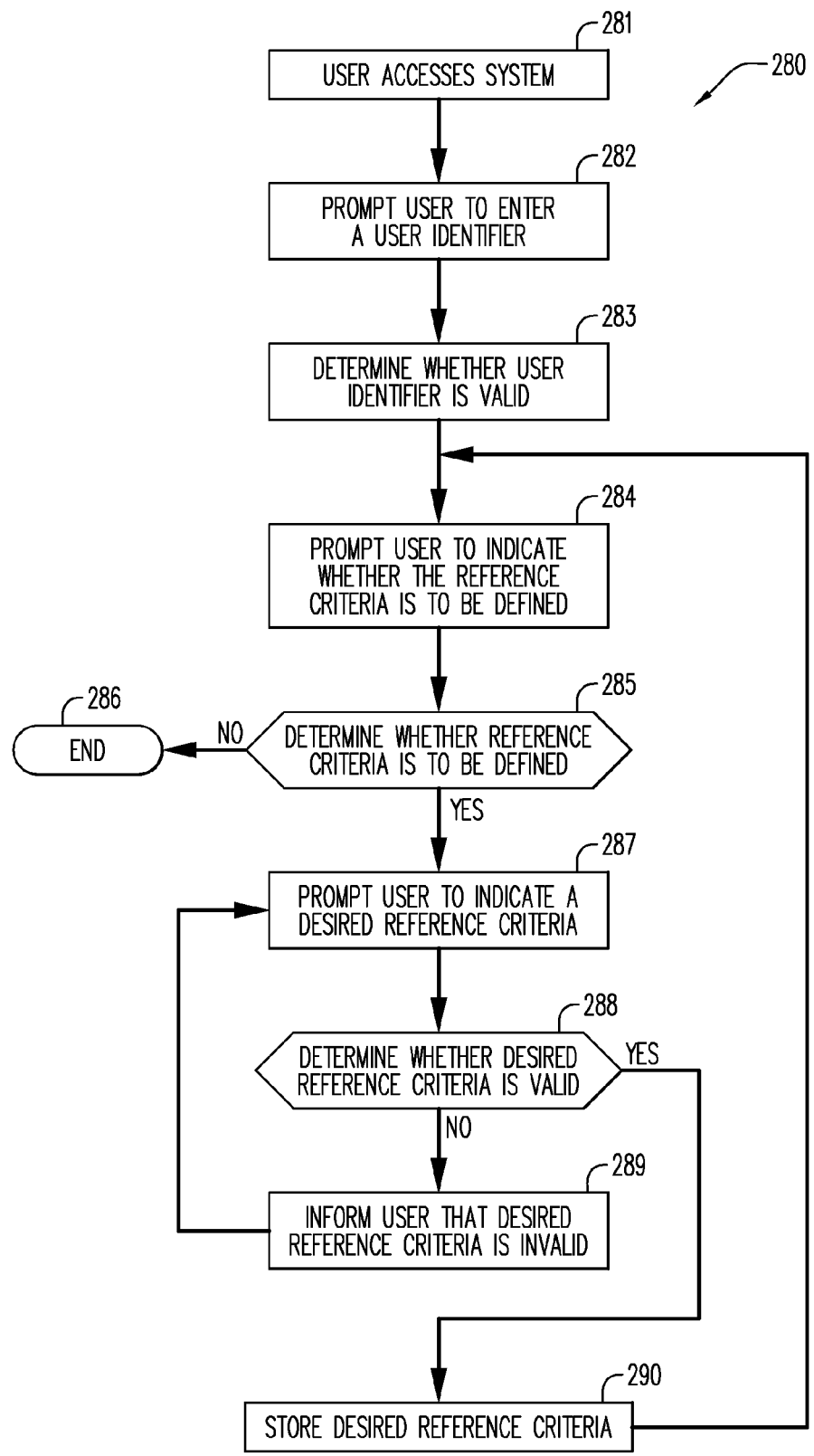

FIG. 2H is a schematic representation of the magnitude of another signal that may be provided by a sensor subsystem 110 in response to shaking the proximity payment device 100 with a force having a magnitude less than a reference magnitude, according to some embodiments. Referring to FIG. 2H, in accordance with some embodiments, the signal may have a magnitude 270 that varies over time. However, the magnitude remains less than the first reference magnitude and greater than the second reference magnitude.

In some embodiments, the user may be provided with the option to define one or more reference criteria. In some embodiments, this may be done via a user interface. In some embodiments, a user interface may comprise a graphical user interface. In some embodiments, the user may be provided with the option to define one or more biometric reference criteria.

FIG. 2I is a flow chart of a method 280 according to some embodiments. In some embodiments, the method 280, or one or more portions thereof, may be used in defining one or more reference criteria. In some embodiments, one or more portions of the method 240 may be performed by the proximity payment device 100 or one or more portions thereof. In some embodiments, one or more portions of the method may be performed by the payment subsystem 101 or one or more portions thereof. In some embodiments, one or more portions of the method may be performed by the control circuit 112. In some embodiments, one or more portions of the method may be performed while power is applied to the proximity payment device 100. In some embodiments, one or more portions of the method may be performed while power is applied to at least a portion of the embodiment of the payment subsystem 101 illustrated in FIG. 1

Referring to FIG. 2I, at 281, a user may access the system. At 282, the user may be prompted (e.g., via a user interface) to enter a user identifier (e.g., a password or personal identification number (PIN)). If the user enters a user identifier, then at 283, the method may further include determining whether the user identifier is valid. If the user identifier is valid, then at 284 the method may include prompting the user to indicate whether a reference criteria is to be defined (e.g., initially and/or changed). At 285 the method may include determining whether a reference criteria is to be defined (e.g., initially and/or changed). If a reference criteria is not to be defined (e.g., initially and/or changed), then at 286, the method may end.

If a reference criteria is to be defined (e.g., initially and/or changed), then at 287, the method may include prompting the user to define the reference criteria.

In some embodiments, the user may define the reference criteria using one or more input devices in and/or on the proximity payment device 100. Thus, the method may include receiving the reference criteria via one or more input devices. In some embodiments, the one or more input device (s) may comprise the sensor subsystem 110.

In some embodiments, the user may define a reference criteria, at least in part, by training the proximity payment device 100. That is, the user may move and/or position the proximity payment device 100 to indicate a desired reference profile. The proximity payment device 100 may capture the profile of the signal provided by the sensor subsystem 101 in response to the desired reference profile.

Figure 2J:
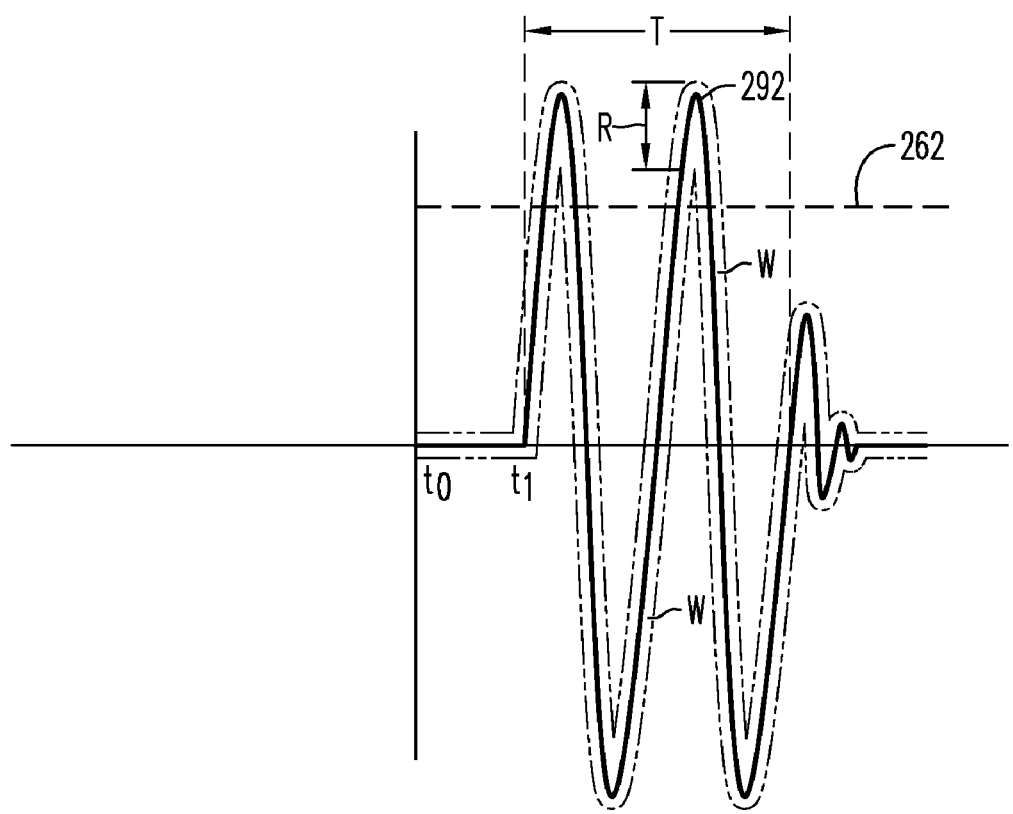
FIG. 2J is a schematic representation of a magnitude of a signal, in accordance with some embodiments.

FIG. 2J is a schematic representation of a magnitude of a signal that may be provided by a sensor subsystem 110 in response to movement and/or positioning provided by the user. Referring also now to FIG. 2J, in accordance with some embodiments, the signal may have a magnitude 292 that varies over time. In this embodiment, the magnitude 292 indicates that the proximity payment device was shaken two times with a force having a magnitude in excess of the first magnitude 262 within a time duration T. Notably, the reference profile provided by the user is not limited to the profile schematically represented in FIG. 2J. In some embodiments, the reference profile may or may not vary smoothly over time, may or may not be sinusoidal, may or may not be periodic and may or may not have symmetry.

In some embodiments, a reference criteria may be based at least in part on the captured profile. In some embodiments, the reference criteria may be equal to the captured profile. Such reference criteria is a type of biometric reference criteria and/or biometric reference profile. In some other embodiments, the method may include defining a range, e.g., range R, disposed about the captured profile, to thereby define a window W that may define the reference criteria. Such reference criteria is a type of biometric reference criteria and/or biometric reference profile.

At 288, the method may further include determining whether the reference criteria is valid. If the reference criteria is not valid, then at 289 the method may include informing the user of such and execution may return to 287. If the reference criteria is valid, then at 290, the method may include storing the reference criteria.

Notably, the range may or may not be uniform along the profile and may or may not be disposed symmetrically about the captured profile. Moreover, the larger the range, the easier it will be for a user (authorized or unauthorized) to move and/or position the proximity payment device 100 in a manner that matches the reference criteria. The smaller the range, the more difficult it will be for a user to move and/or position the proximity payment device 100 in a manner that matches the reference criteria.

In some embodiments, the user may decide to change the reference criteria if the user forgets the reference criteria and/or if information regarding the reference criteria is obtained by an unauthorized user.

In some embodiments, the movement and/or positioning provided by the user to train the proximity payment device 100 may comprise movement and/or positioning used to present the proximity payment device 100 to a proximity coupling device of a POS terminal. In such an embodiment, the reference criteria may be satisfied when the proximity payment device 100 is presented to a proximity payment device. Use of such reference criteria may eliminate the need to satisfy an reference criteria prior to presenting the proximity payment device to the proximity coupling device.

In some embodiments, the proximity payment device 100 may be a stand alone device. In some embodiments, the proximity payment device may be combined with another device, which may include but is not limited to a wristwatch, a keyfob, a mobile telephone, a portable music player and/or a portable data assistant (PDA). The combined device is sometimes referred to herein as a proximity payment device.

Figure 3:
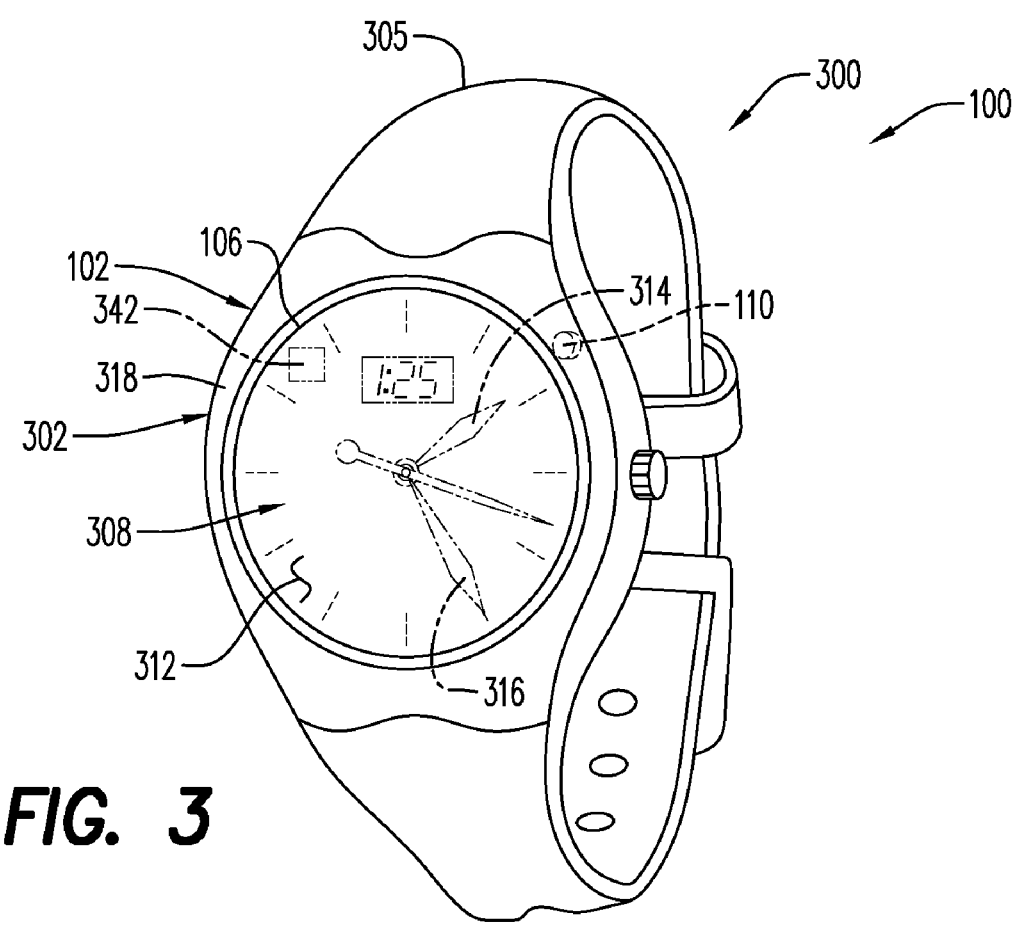
FIG. 3 is a perspective view of a proximity payment device, according to some embodiments.

FIG. 3 is a perspective view of a proximity payment device 100 that comprises a wristwatch 300, according to some embodiments. Referring to FIG. 3, the proximity payment device 100 may include a support structure 102, which may define a case 302 of the wristwatch 300. The proximity payment device 100 may also include an antenna 106 and sensor 110, which may be contained in and/or supported by the case 302. The antenna 106 may be of any type and/or configuration. In some embodiments, the antenna 106 may be operative generally in accordance with the above-mentioned PayPass standard to receive interrogation and power signals (which may be the same signal) from a proximity coupling device of a POS terminal and to transmit payment card account number information and/or other information to the proximity coupling device.

The wristwatch 300 may further include a wristband 305, a display 308 and/or one or more other components (e.g., a movement (not shown), a wristwatch chip (not shown), etc.) of the wristwatch 300. The wristband 305 may be secured to the case 302. The display 308 may indicate time and may comprise an analog display and/or a digital display. An analog display may include a dial (or graduated face) 312 and one or more rotating members (or hands) 314, 316. A digital display may include a numerical display (e.g., a numeric liquid crystal display or numeric LED display).

Figure 4:
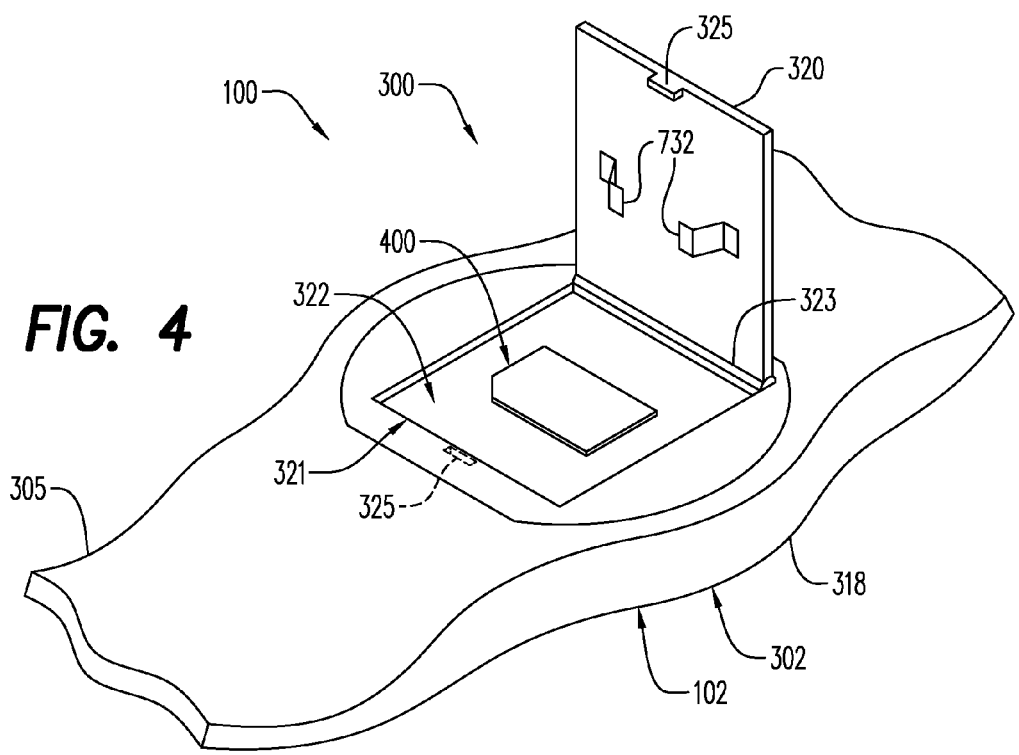
FIG. 4 is a schematic perspective view of a portion of the proximity payment device of FIG. 3, according to some embodiments, with a case in an open state.

FIG. 4 is a schematic, perspective view of a portion of the wristwatch 300, according to some embodiments, with the case 302 in an open state. Referring to FIG. 4, in accordance with some embodiments, the case 302 may include one or more portions, e.g., a front portion 318 and a back portion 320. The front portion 318 may be substantially transparent to allow the display 308 to be seen therethrough. One or more portions of the case 302 may be movable relative to one or more other portions of the case 302 to allow access to an internal chamber 321 of the wristwatch 300. For example, one side of the back portion 320 may be retained by a hinge 323 and the other side of the back portion 320 may be retained by a releasable catch 325, such that upon releasing the releasable catch, one side the back portion 320 may be free to pivot away from the rest of the case 302. The proximity payment device 300 may further include a holder 322 adapted to receive a small IC card 400.

Figure 5:
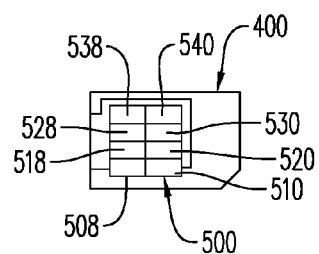
FIG. 5 is a plan view of a small IC card removed from the proximity payment device of FIG. 3, in accordance with some embodiments.

FIG. 5 is a plan view of a small IC card 400, in accordance with some embodiments. Referring to FIG. 5, in some embodiments, the small IC card 400 may have dimensions as defined for the standard card/module referred to as "ID000" in ISO/IEC standard 7810, promulgated by the International Standardization Organization and other bodies.

The small IC card 400 may include an RFID IC 500. In some embodiments, the RFID IC 500 may include the data storage circuit 104 (FIG. 1) and/or the transmit/receive circuit 108 (FIG. 1). In some embodiments, the RFID IC 500 may include several contact pads 508-540, two of which, e.g., contact pads 508, 510, may be electrically connected to the transmit/receive circuit 108 (FIG. 1) and adapted to be electrically connected to the antenna 106. In that regard, in some embodiments, the proximity payment device 100 is enabled for operation if the contact pads 508, 510 are electrically connected to the antenna 106, and not enabled for operation if the contact pads 508, 510 are not electrically connected to the antenna 106.

One or more surfaces of the small IC card 400 may carry one or more logos and/or brands, including for example the brand/logo of a national payment card association such as MasterCard International Incorporated. The brand/logo of the issuer may also be present, as well as, for example, a specific card product brand. Other features that may be present on the small IC card 400 (though such features are not shown) are an adhesive paper strip to receive the signature of the cardholder, and a security code or the like printed on the adhesive strip.

In some embodiments, a payment card account number and/or any other information (or a portion thereof) stored in the IC 500 may be printed on a surface of the small IC card 400.

In some embodiments, the small IC card 400 may comprise a small IC card that is the same as and/or similar to one or more embodiments of the small IC card disclosed in (1) U.S. patent application Ser. No. 11,852,739, entitled "IDENTIFI- CATION TOKEN AND METHOD OF MAKING IDENTIFICATION TOKEN", filed in the name of Simon Phillips on even date herewith, (2) U.S. patent application Ser. No. 11/852,751, entitled "IMPROVED IDENTIFICATION OF INSTALLABLE CARD", filed in the name of Simon Phillips on even date herewith, and/or (3) U.S. patent application Ser. No. 11,852,712, entitled "IDENTIFICATION TOKEN AND METHOD OF MAKING IDENTIFICATION TOKEN", filed in the name of Simon Phillips on even date herewith, the contents of each of which are hereby incorporated by reference.

In some embodiments, the small IC card 400 may comprise a small IC card fabricated using a method that is the same as and/or similar to one or more methods disclosed in (1) U.S. patent application Ser. No. 11,852,739, entitled "IDENTIFICATION TOKEN AND METHOD OF MAKING IDENTIFICATION TOKEN", filed in the name of Simon Phillips on even date herewith, (2) U.S. patent application Ser. No. 11,852,751, entitled "IMPROVED IDENTIFICATION OF INSTALLABLE CARD", filed in the name of Simon Phillips on even date herewith, and/or (3) U.S. patent application Ser. No. 11,852,712, entitled "IDENTIFICATION TOKEN AND METHOD OF MAKING IDENTIFICATION TOKEN", filed in the name of Simon Phillips on even date herewith, the contents of each of which are hereby incorporated by reference.

Figure 6:
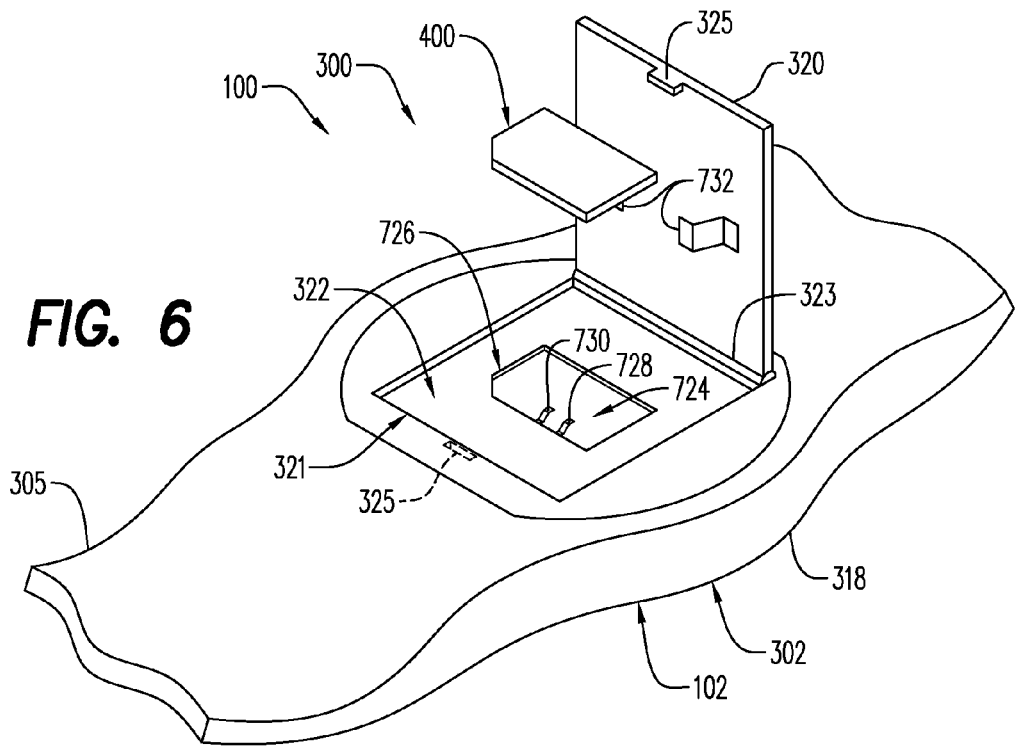
FIG. 6 is a schematic, partially exploded perspective view of a portion of the proximity payment device of FIG. 3, according to some embodiments, with the case in an open state and the small IC card removed.

FIG. 6 is a schematic, partially exploded perspective view of a portion of the wristwatch 300, according to some embodiments, with the case 302 in an open state and the small IC card 400 removed.

Figure 7:
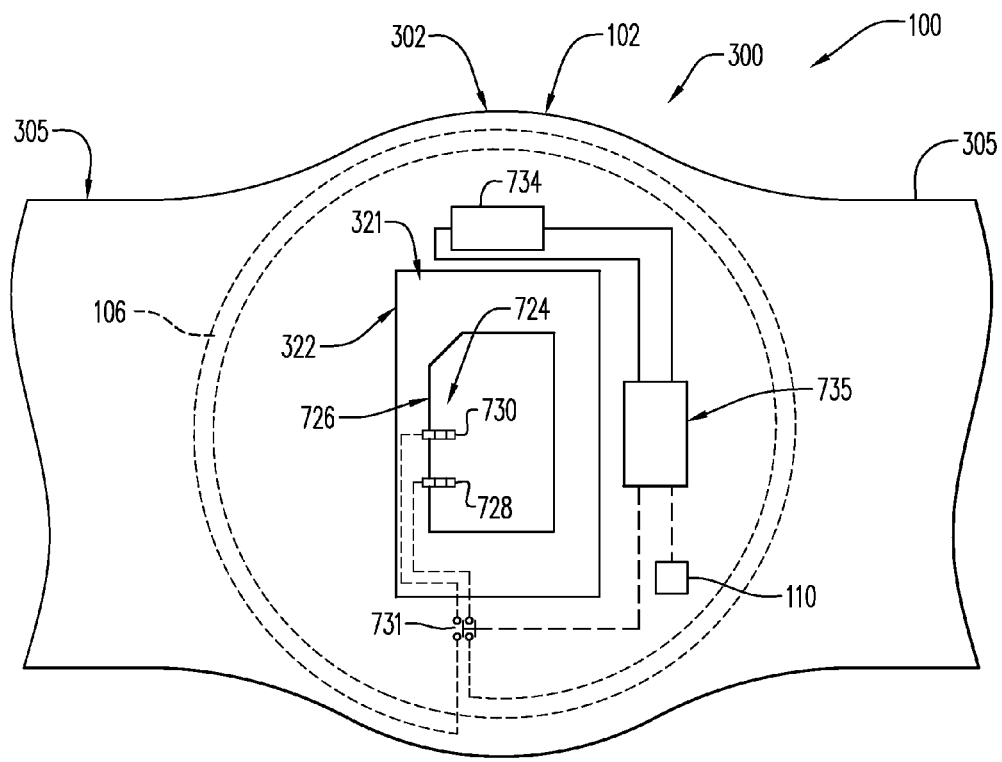
FIG. 7 is a schematic plan view of a portion of the proximity payment device of FIG. 3, according to some embodiments, with the case removed and the small IC card uninstalled.

FIG. 7 is a schematic plan view of a portion of the wristwatch 300, according to some embodiments, with the case removed and the small IC card 400 removed.

Referring to FIGS. 6-7, in accordance with some embodiments, the holder 322 may include a seat 726 adapted to receive the small IC card 400 and to support and/or position the small IC card 400 relative to an electrical interface 724, at least in part. The seat 726 may include a plurality of surfaces which may be adapted to abut surfaces of the small IC card 400 to support and/or position the small IC card 400 in the x, y and z direction, at least in part. The electrical interface 724 may include first and second contacts 728, 730, which may be adapted to contact the contacts 508, 510, respectively, of the IC 500 of the small IC card 400.

A switch 731 may be electrically connected in series between the contacts 728, 730 and the antenna 106. The switch 731 may have an open position and a closed position. With the switch 731 in the closed position, the antenna 106 is electrically connected to the first and second contacts 728, 730 to thereby electrically connect the antenna 106 to the contacts 508, 510, respectively, of the RFID IC 500. With the switch 731 in the open position, the antenna 106 is not electrically connected to the first and second contacts 728, 730 or the contacts 508, 510 of the RFID IC 500.

Thus, the transmit/receive circuitry 108 may be able to transmit the device payment account number and/or otherwise to interact with a POS terminal if the switch 731 is in the closed position. On the other hand, the transmit/receive circuitry 108 may be unable to transmit the device payment account number and/or otherwise to interact with a POS terminal if the switch 731 is in the open position.

Notably, the terms "open position" and "closed position" are not meant to imply that switch 731 is limited to a mechanical switch. In some embodiments, the switch 731 may comprise a transistor and/or other active device(s) and may have an "on state" and an "off state" in lieu of and/or in addition to an "open position" and "closed position".

The contacts 728, 730 may be biased (e.g., in the z direction) so as to help insure contact with respective contacts of the IC 500 of the small IC card 400. In some embodiments, each of the contacts 728, 730 may comprise a spring contact that includes a contact and a spring integral therewith to bias the spring contact (e.g., in the z direction). One or more springs 732 may be provided on the back portion 320 of the case 302 to bias the small IC card 400 toward the holder 322.

Each portion of proximity payment device 100 may comprise any type of material(s) and may have any configuration and/or construction. Thus, for example, the case 302 may comprise any type of material(s) and may have any configuration and/or construction. In some embodiments, the case may comprise a metal, ceramic, glass, plastic, fiber, silicon, semiconductor, and/or a combination thereof. Likewise, a holder 322 and/or seat 726 may have any configuration (e.g., shape and/or size) including for example, rectangular, cylindrical, elliptical, conical, irregular and/or any combination thereof. In some embodiments, the configuration may be based on the configuration of the small IC card to be received and/or any other consideration(s) or combination thereof.

The proximity payment device 100 may further include a power source 734 and a controller 735. The power source 734 may comprise the power source 114 (FIG. 1). Although not shown, in some embodiments, the IC 500, the data storage circuit 104 (FIG. 1) and/or the transmit/receive circuit 108 (FIG. 1) may be electrically connected to and/or receive electric power from the power source 734.

The controller 735 may include the control circuit 112 (FIG. 1) (or a portion thereof) and/or the timer circuit 116 (FIG. 1). In some embodiments, the controller 735, the control circuit 112 (FIG. 1) and/or the timer circuit 116 (FIG. 1) may be electrically connected to and/or receive electric power from the power source 734.

The control circuit 112 may be electrically connected to and/or may control the switch 731 that is electrically connected in series between the contacts 738, 740 and the power source 735. In some embodiments, the control circuit 112 (FIG. 1) may be operative to close the switch 731 to enable operation of the proximity payment device 100 and to open the switch 731 to disable operation of the proximity payment device 100.

The controller 735 may or may not be electrically connected to and/or control any other components (e.g., a movement (not shown) of the wristwatch 300.

In some embodiments, the transmit/receive circuitry 108 may be unable to transmit the device payment account number and/or otherwise to interact with a POS terminal unless the IC 500, the data storage circuit 104 (FIG. 1) and/or the transmit/receive circuit 108 (FIG. 1) receive electrical power from the power source 734.

In that regard, in some embodiments, the switch 731 may be electrically connected in series between the power source 734 and the IC 500, the data storage circuit 104 (FIG. 1) and/or the transmit/receive circuit 108 (FIG. 1). With the switch 731 in the closed position, the power source 734 is electrically connected to the IC 500, the data storage circuit 104 (FIG. 1) and/or the transmit/receive circuit 108 (FIG. 1) are electrically connected to the power source 734, as may be required to transmit the device payment account number and/or otherwise to interact with a POS terminal. Otherwise, the proximity payment device 100 may be disabled. In some embodiments, the control circuit 112 (FIG. 1) may be operative to close the switch 731 to enable operation of the proximity payment device 100 and to open the switch 731 to disable operation of the proximity payment device 100.

In some embodiments, the RFID IC 500 may further include the control circuit 112 (FIG. 1), the timer circuit 116 (FIG. 1) and the switch 731. The switch 731 may be electrically connected in series between the antenna 106 and the transmit/receive circuitry 108 and/or in series between the power source 734 and the control circuit 112 (FIG. 1) and/or the timer circuit 116 (FIG. 1). In some embodiments, the control circuit 112 (FIG. 1) may be operative to close the switch 731 to enable operation of the proximity payment device 100 and to open the switch 731 to disable operation of the proximity payment device 100.

Some embodiments, may use one or more of the techniques disclosed in U.S. patent application Ser. No. 11,852,763, entitled "ENABLING IDENTIFICATION TOKEN FOR A TIMED PERIOD", filed in the name of Simon Phillips on even date herewith, the contents of which are hereby incorporated by reference.

In some embodiments, one or more additional reference criteria may also be employed. Such additional reference criteria may or may not be based on the signal from the sensor. In some embodiments, the additional reference criteria may include a criteria related to time of day and/or a criteria related to the day of month. (In some embodiments, it may not be normal to use the proximity payment device 100 at certain times of the day and/or on certain days of the month.) Thus, in some embodiments, the proximity payment device 100 may not be enabled for operation at certain times of the day and/or certain days of the week.

In some embodiments, device 100 may be employed for one or more functions not related to enabling operation of the proximity payment device. In some embodiments, the device may have access to schedule information for a user. In some embodiments, the schedule information may be used to determine that the user may need to be moving. In some embodiments, schedule information may comprise schedule information that indicates when the user should be going to work, going to a meeting and/or going to another event and/or location. Thus, in some embodiments, the device may determine whether the user should be moving. If the user should be moving, the signal from the sensor may be used to determine whether the user is moving. If the user should be moving and is not moving, an alarm may be provided. In some embodiments, a sensor that comprises GPS may be used to determine whether the user should be moving and/or whether the user is moving in a correct direction. If the user should be moving and is not moving in the correct direction, an alarm or other type of indication may be provided.

In some embodiments, the device comprises a mobile phone and may have access to information that indicates whether the user's mobile phone is ringing and/or has an incoming call. If the phone is ringing and/or has an incoming call, the signal from the sensor may be used to determine whether the phone is moving towards the user's ear and/or simply moving. If the phone is ringing and/or has an incoming call and the phone is moving, the device may answer the phone.

In some embodiments, printed information may be provided by the proximity payment device 100. In some embodiments, printed information may indicate how to enable the proximity payment device. In some embodiments, the indication may be provided on the proximity payment device. If the device includes a case the indication may be provided on such case. If the proximity payment device includes a display, the indication may be provided on the display. In some embodiments, the indication may be provided on the small IC card 400. In some embodiments, the card may include information thereon and a back portion of the case and/or another portion of the case may be transparent and/or open to allow the information to be read.

In some embodiments, the controller 735 may (i) receive information from the small IC card 400 and/or (ii) supply information in regard to the small IC card 400. In some embodiments, one or more portions of the information supplied by the controller 735 may be supplied to the display. In some embodiments, the information supplied by the controller 735 includes one or more signals that identifies the small IC card 400, indicates whether the small IC card 400 is enabled and/or how to enable the small IC card 400. In some embodiments, such information is based at least in part on information received from the small IC card 400.

The display 308 may display information based at least in part on the information supplied thereto. Thus in some embodiments, the display may display information that identifies the small IC card 400, indicates whether the small IC card 400 is enabled and/or how to enable the small IC card 400.

In some embodiments, the display 308 may define an indicator 742. In some embodiments, the indicator 742 displays information regarding the small IC card 400. In some embodiments, the indicator may provide a visual indication that may identify the small IC card 400, indicate how to enable the small IC card 400 and/or whether the small IC card 400 is enabled. In some embodiments, a visual indication may comprise a blinking indication. In some embodiments, indicator 742 may be defined by a discrete light bulb and/or a discrete light emitting diode (LED) rather than by display device 308.

In some embodiments, the information supplied to and/or by the display may define one or more logos and/or brands. In some embodiment, the one or more logos and/or brands may include (i) a brand and/or logo of a national payment card association such as MasterCard International Incorporated, (ii) a brand and/or logo of an issuer and/or merchant associated with the small IC card 400 and/or (iii) a brand and/or logo of a specific card product. In some embodiments, a brand and/or logo may comprise a mark that is registered in one or more country or jurisdiction and/or protected under trademark law in one or more country or jurisdiction.

In some embodiments, one or more portions of the information supplied to and/or by the display may comprise one or more bit map. In some embodiments, a bit map identifies the small IC card 400. In some embodiments, a bit map defines one or more logos and/or brands. In some embodiments, a bit map supplied by the controller is based at least in part on a bit map received from the small IC card 400.

In some embodiments, indicator 742 may comprise audio indicators and/or vibratory indicators in addition to and/or in lieu of indicators that provide visible indication. An audio indicator may provide an audible indication and/or a beeping audible indication. A vibratory indicator may provide a vibratory indication. In some embodiments, the indication may identify the small IC card 400, indicate how to enable the small IC card 400 and/or whether the small IC card 400 is enabled.

In some embodiments, a wristwatch 300 and/or other type of proximity payment device 100 may be adapted to receive more than one small IC card 400. In some embodiments, a wristwatch 300 and/or other type of proximity payment device 100 may be the same as and/or similar to one or more embodiments of a wristwatch and/or other type of proximity payment device disclosed in U.S. patent application Ser. No. 11,852,712, entitled "IDENTIFICATION TOKEN AND METHOD OF MAKING IDENTIFICATION TOKEN", filed in the name of Simon Phillips on even date herewith, the contents of which are hereby incorporated by reference.

Figure 8:
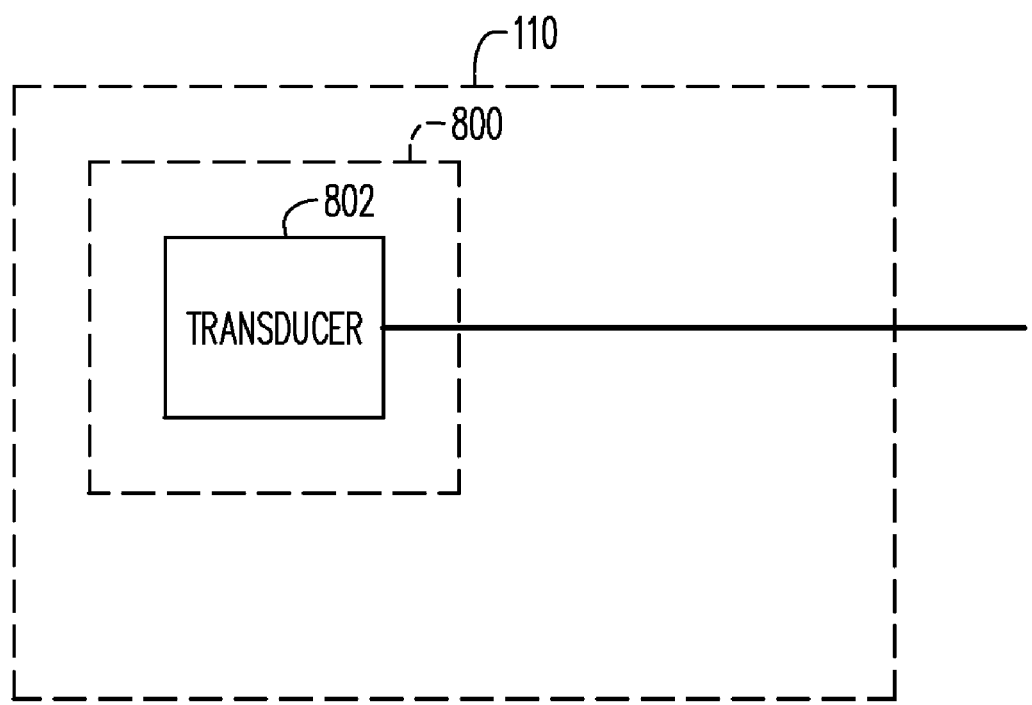
FIG. 8 is a schematic block diagram of sensor subsystem, in accordance with some embodiments.

FIG. 8 is a schematic block diagram of sensor subsystem 110 that comprises an accelerometer, a rotation sensor, a velocity sensor, a position sensor and/or other type of sensor, in accordance with some embodiments. Referring to FIG. 8, in some embodiments, the sensor subsystem 110 may comprise a sensor 800 that includes a transducer 802. The transducer 802 may convert energy from one form to another. If the sensor 800 comprises an accelerometer, the transducer 802 may convert acceleration, shock and/or vibration energy to an electrical signal.

As used herein, a controller may be any type of controller. For example, a controller may be programmable or non programmable, general purpose or special purpose, dedicated or non dedicated, distributed or non distributed, shared or not shared, and/or any combination thereof. If the controller has two or more distributed portions, the two or more portions may communicate with one another through a communication link. A controller may include, for example, but is not limited to, hardware, software, firmware, hardwired circuits and/or any combination thereof.

A circuit may be programmable or non programmable, general purpose or special purpose, dedicated or non dedicated, distributed or non distributed, shared or not shared, and/or any combination thereof. If the circuit has two or more distributed portions, the two or more portions may communicate with one another through a communication link. A circuit may include, for example, but is not limited to, hardware, software, firmware, hardwired circuits and/or any combination thereof.

A communication link may be any type of communication link, for example, but not limited to, wired (e.g., conductors, fiber optic cables) or wireless (e.g., acoustic links, electromagnetic links or any combination thereof including, for example, but not limited to microwave links, satellite links, infrared links), and/or combinations thereof, each of which may be public or private, dedicated and/or shared (e.g., a network). A communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols including, for example, but not limited to the Internet Protocol.

In accordance with some embodiments, the proximity payment device 100 may be presented to a proximity coupling device by positioning the proximity payment device 100 in physical contact with the proximity coupling device.

Figure 9:
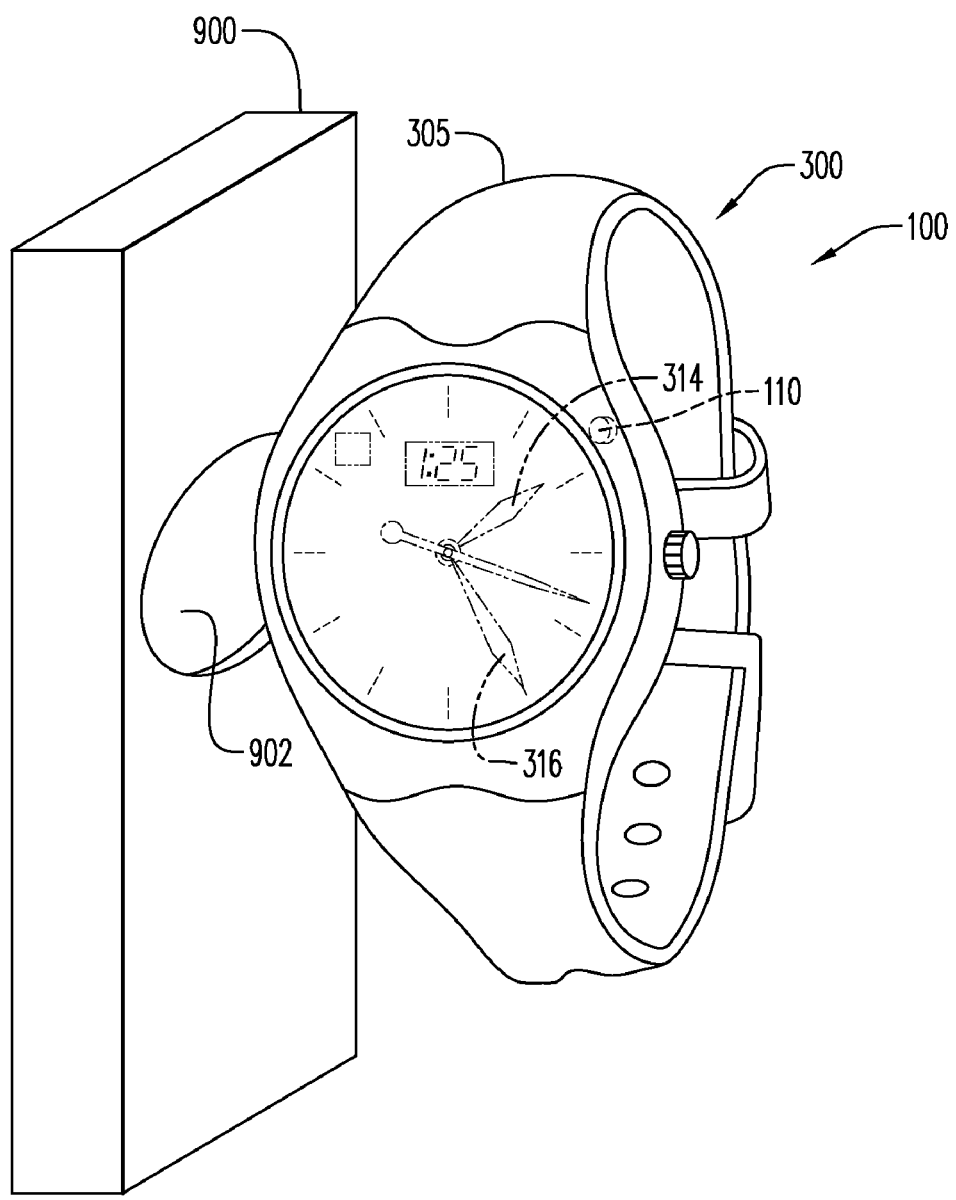
FIG. 9 is a schematic perspective view of a proximity payment device and a proximity coupling device in accordance with some embodiments.

FIG. 9 is a schematic perspective view of a proximity payment device being presented to a proximity coupling device in accordance with some embodiments. Referring to FIG. 9, in some embodiment, the proximity payment device 100 may be presented to a proximity coupling device 900 by tapping a portion of the proximity payment device 100 on a portion of the proximity coupling device (e.g., a designated portion 902 of the proximity coupling device, which may include a transmitter and/or receiver).

However, in some embodiments, the proximity payment device 100 may be presented to a proximity coupling device 900 by positioning the proximity payment device within range of the proximity coupling device so as to permit wireless communication between the proximity payment device 100 and the proximity coupling device 900, which in some embodiments may not require positioning the proximity payment device 100 in physical contact with the proximity coupling device.

In some embodiments, lettering (not shown) or other symbols (not shown) may be present on the front surface 1412 of the card-shaped body 1402 and/or on the rear surface (not shown) of the card-shaped body 1402. The proximity payment card 100 may have one or more magnetic stripes (not shown) on the card-shaped body 1402 to allow the proximity payment card 100 to be read by a magnetic card reader. In addition, or alternatively, there may be embossed numbers and/or letters on the card-shaped body to indicate one or more account numbers and/or the name of the holder of the proximity payment card 100. In addition, or alternatively, non-embossed printing on the front surface 1412 may indicate the account numbers and/or the holder's name. Still further, the front surface 1412 of the card-shaped body 1402 may carry one or more logos and/or brands, including for example the brand/logo of a national payment card association such as MasterCard International Incorporated. The brand/logo of the issuer may also be present, as well as, for example, a specific card product brand. Other conventional features that may be present on the proximity payment card 100 (though such features are not shown) are an adhesive paper strip to receive the signature of the cardholder, and a security code or the like printed on the adhesive strip.

In some embodiments, as an alternative to powering some or all of the circuitry shown in FIG. 1 from a battery to allow the control circuit 112 to detect actuation of the switch, the circuitry may instead be powered by a storage capacitor that has been suitably charged. In addition or alternatively, the time period for enablement of the proximity payment device may be measured out by a capacitor that is charged to start the time period, and then discharges to measure out the time period. The state of the latter capacitor may be monitored by, e.g., the control circuit 112 to determine whether the proximity payment device 100 should respond to any interrogation signal that it may receive.

In another embodiment, the switch 110 may be coupled to a processing/control circuit (not shown) that is separate from the data storage circuit 104 and the transmit/receive circuit 108. For example, the switch may be coupled to the control circuit used for controlling other functions in the device (such as wristwatch functions). In response to the switch being actuated, the control circuit may enable the RFID IC for a payment transaction for a measured time period. In this case, the payment aspects of the device may be powered entirely by the interrogation signal from the POS terminal.

In some embodiments one or more of the circuits of the proximity payment device may include an enable line that may be used to enable and/or disable the proximity payment device. In some embodiments, methods in addition to and/or in lieu of those described herein may be employed to enable and/or disable the proximity payment device.

The proximity payment device may be a wristwatch, a wristband, a bracelet, a pendant or may be in another form. Consequently, the housing 102 may be the case of a wristwatch, a wristband, a bracelet, a pendant or another form.

As used herein and in the appended claims, "proximity payment device" refers to any device, of any shape, which transmits to a point of sale terminal, by wireless transmission, a payment account number. As used herein and in the appended claims, a payment account number may be numeric, non numeric and/or a combination thereof.

One or more of the proximity payment devices may also have a contact interface like that of a conventional smart card that includes a contact interface.

As used herein and in the appended claims the term "identification token" refers to a device, of any shape, that serves as one or more of a proximity payment device, a transportation related device, an identification device, an RFID-enabled passport.

The principles taught herein have heretofore been described in the context of proximity payment devices. Nevertheless, these teachings are also applicable to any type of identification token. As used herein and in the appended claims the term "identification token" refers to a device, having a card shape or any other shape, that serves as one or more of a proximity payment device; a transportation related device; a device to identify the holder for purposes apart from or in addition to transaction payments (e.g., to identify medical patients and/or individuals insured by health insurance plans); a device used to portably store medical record information; stored value card(s); and to so-called electronic passports (also known as RFID-enabled passports) and/or a source of any type of information associated with a holder of the identification token (and/or the holder of the card installed therein).

The term "transportation related device" refers to a card or other device used to pay, or confirm or evidence payment of, a charge for using a transportation system and/or cards or the like issued by transportation systems (e.g., mass transit systems) for access to the transportation systems. The term "RFID-enabled passport" refers to an internationally recognized travel document that includes an IC and an antenna and communicates with a terminal by a wireless communication technique. The term "information" may include but is not limited to a name, a social security number, an account number, an expiration date, a security code and/or medical information.

As used herein, an account number may be numeric, non numeric and/or a combination thereof.

Notably, the size of the IC card compared to the rest of the structure may be different than shown. In some embodiments, the IC card may be the same size as the rest of the structure to which it is attached or even larger than the rest of the structure to which it is attached.

As used herein, the term surrounding includes both completely surrounding and partially surrounding. Thus, a surrounding card may be a completely surrounding card and/or a partially surrounding card.

The above description and the accompanying drawings should not be understood to imply a fixed order for performing the method steps. Rather, the method steps may be performed in any order that is practicable.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
    sensing movement of an identification token, the identification token comprising a mobile telephone device;
    determining whether a criteria to operate the identification token as a proximity payment device based on the sensing of the movement of an identification token is satisfied, wherein the determining comprises determining whether the movement satisfies a reference criteria, including determining whether the movement indicates that the identification token has been shaken with a force having a magnitude in excess of a reference magnitude; and
    enabling operation of the identification token, in an instance the criteria is satisfied, as a proximity payment device, wherein the sensing and the enabling is initiated prior to presentation of the identification token to a proximity coupling device.

2. The method of claim 1, wherein sensing movement of the identification token comprises:
    sensing acceleration of the identification token.

3. The method of claim 2, wherein determining whether the movement satisfies the reference criteria comprises:
    determining whether the acceleration satisfies a reference criteria.

4. The method of claim 2, wherein determining whether the movement satisfies the reference criteria comprises:
    determining whether the acceleration satisfies a biometric reference criteria defined by a motion made by a user of the identification token to indicate a reference criteria.

5. The method of claim 2, wherein determining whether the movement satisfies the reference criteria comprises:
    determining whether the acceleration indicates that the identification token has been shaken with a force having a magnitude in excess of a reference magnitude.

6. The method of claim 2, wherein sensing movement of the proximity payment device comprises:
    sensing acceleration of the proximity payment device.

7. The method of claim 6, wherein determining whether the movement satisfies a reference criteria comprises:
    determining whether the acceleration satisfies a reference criteria.

8. The method of claim 6, wherein determining whether the movement satisfies the reference criteria comprises:
    determining whether the acceleration satisfies a biometric reference criteria defined by a motion made by a user of the identification token to indicate a reference criteria.

9. The method of claim 6, wherein determining whether the movement satisfies the reference criteria comprises:
    determining whether the acceleration indicates that the proximity payment device has been shaken with a force having a magnitude in excess of a reference magnitude.

10. An apparatus comprising:
    an identification token comprising:
        a mobile telephone device;
        a sensor to provide a signal indicative of movement of the identification token, wherein the sensor comprises a sensor to provide a signal indicative of acceleration of the identification token; and
        circuitry, to receive the signal, to determine whether a criteria to operate the identification token as a proximity payment device based on the signal is satisfied, and to enable operation of the identification token, in an instance the criteria is satisfied, to operate the identification token as a proximity payment device, wherein the circuitry comprises circuitry to determine whether the movement satisfies a reference criteria;
        wherein the sensor provides a signal indicative of movement of the identification token and the circuitry determines whether to operate the identification token as a proximity payment device prior to presentation of the identification token to a proximity coupling device.

11. The apparatus of claim 10, wherein the circuitry to determine whether the movement satisfies a reference criteria comprises:

circuitry to determine whether the acceleration satisfies a reference criteria.

12. The apparatus of claim 10, wherein the circuitry to determine whether the movement satisfies a reference criteria comprises:

circuitry to determine whether the acceleration satisfies a biometric reference criteria defined by a motion made by a user of the identification token to indicate a reference criteria.

13. The apparatus of claim 10, wherein the circuitry to determine whether the movement satisfies a reference criteria comprises:

circuitry to determine whether the acceleration indicates that the identification token has been shaken with a force having a magnitude in excess of a reference magnitude.

14. The apparatus of claim 10, wherein the sensor comprises a sensor to provide a signal indicative of acceleration of the proximity payment device.

15. The apparatus of claim 14, wherein the circuitry to determine whether the movement satisfies a reference criteria comprises:

circuitry to determine whether the acceleration satisfies a reference criteria.

16. The apparatus of claim 14, wherein the circuitry to determine whether the movement satisfies a reference criteria comprises:

circuitry to determine whether the acceleration satisfies a biometric reference criteria defined by a motion made by a user of the identification token to indicate a reference criteria.

17. The apparatus of claim 14, wherein the circuitry to determine whether the movement satisfies a reference criteria comprises:

circuitry to determine whether the acceleration indicates that the proximity payment device has been shaken with a force having a magnitude in excess of a reference magnitude.

* * * * *